US011587548B2

(12) United States Patent
Zhang et al.

(10) Patent No.: US 11,587,548 B2
(45) Date of Patent: Feb. 21, 2023

(54) TEXT-DRIVEN VIDEO SYNTHESIS WITH PHONETIC DICTIONARY

(71) Applicant: Baidu USA, LLC, Sunnyvale, CA (US)

(72) Inventors: Sibo Zhang, San Jose, CA (US); Jiahong Yuan, Cherry Hill, NJ (US); Miao Liao, San Jose, CA (US); Liangjun Zhang, Cupertino, CA (US)

(73) Assignee: Baidu USA LLC, Sunnyvale, CA (US)

( * ) Notice: Subject to any disclaimer, the term of this patent is extended or adjusted under 35 U.S.C. 154(b) by 15 days.

(21) Appl. No.: 17/221,701

(22) Filed: Apr. 2, 2021

(65) Prior Publication Data

US 2021/0390945 A1  Dec. 16, 2021

Related U.S. Application Data

(63) Continuation-in-part of application No. 16/980,373, filed as application No. PCT/CN2020/095891 on Jun. 12, 2020.

(51) Int. Cl.
*G10L 13/08* (2013.01)
*G10L 13/02* (2013.01)
(Continued)

(52) U.S. Cl.
CPC .......... *G10L 13/08* (2013.01); *G06F 16/7834* (2019.01); *G06F 16/7867* (2019.01);
(Continued)

(58) Field of Classification Search
None
See application file for complete search history.

(56) References Cited

U.S. PATENT DOCUMENTS 5,970,453 A * 10/1999 Sharman ................. G10L 13/07
704/260
7,412,393 B1 * 8/2008 De Fabbrizio .......... G06F 3/167
704/E15.04
(Continued)

FOREIGN PATENT DOCUMENTS

CN 104732590 A 6/2015
CN 108537743 A 9/2018
(Continued)

OTHER PUBLICATIONS

Ginosar et al.,"Learning Individual Styles of Conversational Gesture," in Proceedings of the IEEE Conference on Computer Vision & Pattern Recognition, 2019. (10 pgs).
(Continued)

*Primary Examiner* — Martin Mushambo
(74) *Attorney, Agent, or Firm* — North Weber & Baugh LLP

(57) ABSTRACT

Presented herein are novel approaches to synthesize video of the speech from text. In a training phase, embodiments build a phoneme-pose dictionary and train a generative neural network model using a generative adversarial network (GAN) to generate video from interpolated phoneme poses. In deployment, the trained generative neural network in conjunction with the phoneme-pose dictionary convert an input text into a video of a person speaking the words of the input text. Compared to audio-driven video generation approaches, the embodiments herein have a number of advantages: 1) they only need a fraction of the training data used by an audio-driven approach; 2) they are more flexible and not subject to vulnerability due to speaker variation; and 3) they significantly reduce the preprocessing, training, and inference times.

20 Claims, 18 Drawing Sheets

(51) Int. Cl.
| | |
|---|---|
| *G10L 15/187* | (2013.01) |
| *G06F 16/783* | (2019.01) |
| *G06F 16/78* | (2019.01) |
| *G06F 40/242* | (2020.01) |
| *G10L 13/027* | (2013.01) |
| *G06N 3/04* | (2023.01) |
| *G06N 3/08* | (2023.01) |

(52) U.S. Cl.
CPC ............. *G06F 40/242* (2020.01); *G06N 3/04* (2013.01); *G06N 3/08* (2013.01); *G10L 13/027* (2013.01); *G10L 15/187* (2013.01)

(56) References Cited

U.S. PATENT DOCUMENTS

| | | | | |
|---|---|---|---|---|
| 8,160,877 | B1* | 4/2012 | Nucci | G10L 17/06 704/247 |
| 2006/0200344 | A1* | 9/2006 | Kosek | G10L 21/0208 704/226 |
| 2007/0150271 | A1* | 6/2007 | Virette | G10L 19/0212 704/E19.041 |
| 2008/0167862 | A1* | 7/2008 | Mohajer | G10L 25/90 704/207 |
| 2012/0203557 | A1* | 8/2012 | Odinak | G01C 21/3608 704/270.1 |
| 2013/0132085 | A1* | 5/2013 | Mysore | G10L 15/144 704/256.1 |
| 2013/0262096 | A1* | 10/2013 | Wilhelms-Tricarico | G10L 13/04 704/207 |
| 2014/0236597 | A1* | 8/2014 | Ben Ezra | G10L 13/06 704/235 |
| 2015/0199956 | A1* | 7/2015 | Tan | G10L 13/08 704/260 |
| 2015/0243275 | A1* | 8/2015 | Luan | G06F 3/04847 704/260 |
| 2019/0189117 | A1 | 6/2019 | Kumar | |
| 2020/0204878 | A1 | 6/2020 | Canton | |
| 2020/0294201 | A1 | 9/2020 | Planche | |
| 2020/0320306 | A1 | 10/2020 | Tian | |
| 2020/0342646 | A1 | 10/2020 | Wang | |

FOREIGN PATENT DOCUMENTS

| | | |
|---|---|---|
| CN | 110489707 A | 11/2019 |
| WO | 2019090213 A1 | 5/2019 |

OTHER PUBLICATIONS

Thies et al.,"Deferred Neural Rendering:Image synthesis using neural textures," arXiv preprint arXiv:1904.12356, 2019. (12pgs).
H. Ren, "On the Acoustic Structure of Diphthongal Syllables," Ph.D. thesis, UCLA, 1986. (114pgs) [online], [Retrieved Apr. 5, 2022]. Retrieved from Internet <URL: https://escholarship.org/uc/item/8431z0hn>.
Cao et al.,"OpenPose: realtime multi-person 2D pose estimation using Part Affinity Fields," in arXiv preprint arXiv:1812.08008, 2018. (14 pgs).
Yuan et al.,"Speaker identification on the scotus corpus," The Journal of the Acoustical Society of America, vol. 123, 2008. (4 pgs).
Wang et al.,"Video-to-video synthesis," in Advances in Neural Information Processing Systems (NeurIPS), 2018. (14 pgs).
Sanderson et al., "Multi-region probabilistic histograms for robust and scalable identity inference," In International conference on biometrics, 2009. (11 pgs).
Garofolo et al.,"TIMIT Acoustic-Phonetic Continuous Speech Corpus," Linguistic Data Consortium, 1993. (94pgs).
Hunt et al., "Unit selection in a concatenative speech synthesis system using alarge speech database,"1996 IEEE Intr. Conf. on Acoustics,Speech,& Signal Processing, 1996.(4pgs).

Suwajanakorn et al.,"Synthesizing Obama: learning lip sync from audio," ACM Transactions on Graphics (TOG), vol. 36, No. 4, pp. 95, 2017. (13 pgs).
Thies et al.,"Neural voice puppetry:Audio-driven facial reenactment," arXiv preprint arXiv: 1912.05566, 2019. (12 pgs).
Liao et al.,"Speech2Video Synthesis with 3D Skeleton Regularization and Expressive Body Poses," In Proceedings of the Asian Conference on Computer Vision (ACCV), 2020. (16 pgs).
Ezzat et al., "Visual Speech Synthesis by Morphing Visemes," International Journal of Computer Vision, 2002. (14 pgs).
Taylor et al.,"Dynamic Units of Visual Speech," in Proceedings of the 11th ACM SIGGRAPH/Eurographics conference on Computer Animation, 2012. [Abstract] (5pgs).
Fried et al.,"Text-based editing of talking-head video," arXiv preprint arXiv:1906.01524, 2019. (14 pgs).
Chen et al.,"Hierarchical Cross-Modal Talking Face Generation with Dynamic Pixel-Wise Loss," arXiv preprint arXiv:1905.03820, 2019. (10pgs).
Zhou et al.,"Talking face generation by adversarially disentangled audio-visual representation," arXiv preprint arXiv:1807.07860, 2019. (9pgs).
Wang et al.,"Speech Driven Talking Head Generation via Attentional Landmarks Based Representation," Proc. Interspeech 2020, pp. 1326-1330, 2020. (5 pgs).
Taylor et al., "A Deep Learning Approach for Generalized Speech Animation," ACM Transactions on Graphics (TOG), vol. 36, No. 4, pp. 1-11, 2017. (11 pgs).
Isola et al.,"Image-to-image translation with conditional adversarial networks," In Computer Vision and Pattern Recognition (CVPR), 2017 IEEE Conference, 2017. (10 pgs).
D. Klatt, "Software for a cascade/parallel formant synthesizer," Journal of the Acoustical Society of America, 67:971-995, 1980. (25 pgs).
Ping et al.,"Deep voice 3: Scaling text-to-speech with convolutional sequence learning," Proceedings of ICLR 2018, 2018. (16 pgs).
Prajwal et al.,"A lip sync expert is all you need for speech to lip generation in the wild," arXiv preprint arXiv:2008.10010, 2020. (10pgs).
Shen et al.,"Natural TTS Synthesis by Conditioningwavenet on MEL Spectrogram Predictions," arXiv preprint arXiv:1712.05884, 2018. (5pgs).
P. Taylor, "Text-to-Speech Synthesis," Cambridge University Press, 2009. (627pgs).
Tokuda et al.,"An HMM-Based Speech Synthesis System Applied to English," Proceedings of 2002 IEEE Workshop on Speech Synthesis, 2002. (4pgs).
Van den Oord et al.,"WAVENET: A Generative Model for Raw Audio,"arXiv preprint arXiv:1609.03499, 2016. (15ps).
Wang et al.,"Few-shot Video-to-Video Synthesis," arXiv preprint arXiv:1910.12713, 2019. (14pgs).
Graves et al.,"Framewise Phoneme Classification withBidirectional LSTM and Other Neural NetworkArchitectures," Neural networks 18, 2005. (8pgs).
Kingma et al.,"Adam: A method for stochastic optimization," arXiv preprint arXiv:1412.6980, 2014. (15 pgs).
Wikipedia, "Audio normalization," [online], [Retrieved Sep. 11, 2020], Retrieved from Internet <URL: https://en.wikipedia.org/wiki/Audio_normalization> (2pgs).
Wikipedia, "Root mean square," [online], [Retrieved Sep. 11, 2020], Retrieved from Internet <URL: https://en.wikipedia.org/wiki/Root_mean_square> (4pgs).
Suwajanakorn et al.,"Synthesizing Obama: Learning Lip Sync from Audio," ACM Transactions on Graphics (TOG), 2017. (13pgs).
Taylor et al.,"A deep learning approach for generalized speech animation," ACM Transactions on Graphics (TOG), 2017. (16 pgs).
Kim et al.,"LumièreNet: Lecture Video Synthesis from Audio," arXiv preprint arXiv:1907.02253, 2019. (9 pgs).
Ge et al.,"3D Hand Shape and Pose Estimation from a Single RGB Image," arXiv preprint arXiv:1903.00812, 2019. (12pgs).
Kanazawa et al.,"Learning 3D Human Dynamics from Video," arXiv preprint arXiv:1812.01601, 2019. (12pgs).

(56) References Cited

OTHER PUBLICATIONS

Pavllo et al.,"3D human pose estimation in video with temporal convolutions and semi-supervised training," arXiv preprint arXiv:1811.11742, 2019. (13pgs).
Cao et al.,"OpenPose: Realtime Multi-Person 2D PoseEstimation using Part Affinity Fields," arXiv preprint arXiv:1812.08008,2019. (14pgs).
Pavlakos et al.,"Expressive body capture: 3D hands, face, and body from a single image," arXiv preprint arXiv:1904.05866, 2019. (22pgs).
Karras et al.,"Audio-driven facial animation by joint end-to-end learning of pose and emotion," ACM Transactions on Graphics (TOG), 2017. (12 pgs).
International Search Report dated Mar. 1, 2021, in International Patent Application No. PCT/CN2020/095891, filed Jun. 12, 2020. (5pgs).
Written Opinion of the International Searching Authority dated Mar. 1, 2021, in International Patent Application No. PCT/CN2020/095891, filed Jun. 12, 2020. (4 pgs).
Shlizerman et al.,"Audio to body dynamics," arXiv preprint arXiv:1712.09382, 2017. (10pgs).
Yan et al.,"Convolutional sequence generation for skeleton-based action synthesis," In Proceedings of the IEEE International Conference on Computer Vision, 2019. (9pgs).
Martinez et al.,"On human motion prediction using recurrent neural networks," arXiv preprint arXiv:1705.02445, 2017. (10pgs).
Li et al.,"Auto-conditioned recurrent networks for extended complex human motion synthesis," arXiv preprint arXiv:1707.05363, 2017. (13 pgs).
Isola et al.,"Image-to-image translation with conditional adversarial networks," arXiv preprint arXiv:1611.07004, 2018. (17pgs).
Wang et al.,"High-Resolution Image Synthesis and Semantic Manipulation with Conditional GANs," arXiv preprint arXiv:1711.11585, 2018. (14pgs).
Wang et al.,"Video-to-video synthesis," arXiv preprint arXiv:1808.06601, 2018. (14pgs).
Shysheya et al.,"Textured neural avatars," arXiv preprint arXiv:1905.08776, 2019. (11 pgs).
Cai et al.,"Deep video generation, prediction and completion of human action sequences," arXiv preprint arXiv:1711.08682, 2017. (10pgs).
Mittal et al.,"Animating face using disentangled audio representations," arXiv preprint arXiv:1910.00726, 2019. (9pgs).
Notice of Allowance and Fee Due, dated Apr. 4, 2022, in the related matter U.S. Appl. No. 16/980,373. (12pgs).
Thies et al.,"Neural voice puppetry:Audio-driven facial reenactment," arXiv preprint arXiv:1912.05566, 2019. (23 pgs).
Thies et al.,"Face2face:Real-time face capture and reenactment of rgb videos," In Proceedings of the IEEE conference on computer vision and pattern recognition, 2016. (9pgs).
Chan et al.,"Everybody dance now," In Proceedings of the IEEE International Conference on Computer Vision, 2019. (10pgs).
Liu et al.,"Liquid Warping GAN: A Unified Framework for Human Motion Imitation,Appearance Transfer and Novel View Synthesis," arXiv preprint arXiv:1909.12224, 2019. (11 pgs).
Ginosar et al.,"Learning individual styles of conversational gesture," arXiv preprint arXiv:1906.04160, 2019. (11 pgs).
Romero et al.,"Embodied Hands: Modeling and Capturing Hands and Bodies Together," ACM Transactions on Graphics (ToG), 2017. (17pgs).
Logan et al.,"Mel frequency cepstral coe cients for music modeling," In ISMIR, vol. 270, 2000, (13 pgs).
D. R Reddy, "Speech recognition by machine: A review," Proceedings of the IEEE vol. 64, No. 4, 1976. (31 pgs).
Hochreiter et al.,"Long short-term memory," Neural computation 9 (8), 1997. (32pgs).
Notice of Allowance and Fee(s) Due, dated Jun. 10, 2022, in the related matter U.S. Appl. No. 16/980,373. (8pgs).
Notice of Allowance And Fee(s) Due, dated Oct. 4, 2022, in the related matter U.S. Appl. No. 16/980,373. (9 pgs).

* cited by examiner

TEXT-DRIVEN VIDEO SYNTHESIS WITH PHONETIC DICTIONARY

CROSS-REFERENCE TO RELATED APPLICATION

This patent application is a continuation-in-part and claims priority benefit under 35 USC § 120 to co-pending and commonly-owned U.S. patent application Ser. No. 16/980,373, filed on 11 Sep. 2020, entitled "PERSONALIZED SPEECH-TO-VIDEO WITH THREE-DIMENSIONAL (3D) SKELETON REGULARIZATION AND EXPRESSIVE BODY POSES," and listing Miao Liao, Sibo Zhang, Peng Wang, and Ruigang Yang as inventors, which patent document claims priority to and was filed pursuant to 35 USC § 371 as a US National Phase Application of International Patent Application No. PCT/CN2020/095891, filed on 12 Jun. 2020, entitled "PERSONALIZED SPEECH-TO-VIDEO WITH THREE-DIMENSIONAL (3D) SKELETON REGULARIZATION AND EXPRESSIVE BODY POSES," listing Miao Liao, Sibo Zhang, Peng Wang, and Ruigang Yang as inventors. Each aforementioned patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for synthesizing video of speech from an input set of text.

B. Background

Deep neural networks have achieved great successes in many domains. With the advance of deep learning technology, automatic video generation from audio (speech2video) or text (text2video) has become an emerging and promising research topic. It introduces exciting opportunities for applications such as artificial intelligence (AI) news broadcast, video synthesis, and digital humans.

Speech-to-video (Speech2Video) models are trained to map speech to video. Because of speaker variability in speech, speech-to-video models need to be trained on a large amount of data, and they are not robust to different speakers. Such models are also less flexible to use speech as the input as compared to text. Furthermore, most previous methods that generate video from the speech are based on long short-term memory (LSTM) to learn audio information. However, LSTM-based methods have some limitations. First, the network needs a lot of training data. Second, the voice of a different person degrades output motion quality. Third, one cannot manipulate motion output, such as changing speech attitude, since the network is a black box on what is learned.

Accordingly, what is needed are better systems and methods for generating speech videos.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
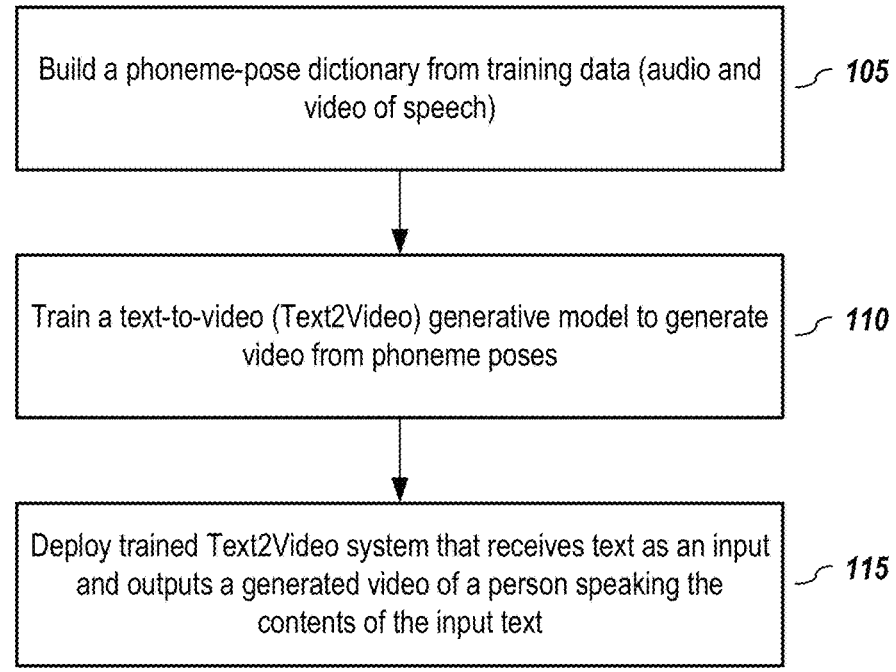
FIG. 1 depicts a general methodology for training and deploying a Text2Video system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of talking-head speech video, aspects of the present disclosure are not so limited. Accordingly, the aspects of the present disclosure may be applied or adapted for use in other contexts.

A. General Introduction

As noted above, speech-to-video approaches, which use audio as the input, have significant challenges. Compared to audio-based methods, text-based methods have advantages. Embodiments herein instead synthesize talking-head video from a text input. Such embodiments may be referred to herein, for convenience, as Text2Video or Text2Video embodiments. A video generated from a text-based methodology is preferrable agnostic to voice identity of a different person.

In this patent document, embodiments for generating video from a text are presented. In one or more embodiments, a phoneme-to-pose dictionary is generated, and a generative adversarial network (GAN) is trained to generate video from interpolated phoneme poses. In one or more embodiments, forced alignment is employed to extract phonemes and their timestamps from training data to build a phoneme-pose dictionary. Embodiments were applied to both English and Mandarin Chinese. To demonstrate effectiveness, experiments were conducted on a number of datasets. Results showed that the tested embodiments achieved higher overall visual quality scores compared to state-of-the-art systems.

Some of the novel contributions include, but are not limited to, the following:

Novel pipeline embodiments for generating talking-head speech videos from any text input, including English, Chinese, numbers, and punctuation. The inference time for a trained embodiment was fast as ten frames per minute.

Embodiments of automatic pose extraction methodologies were developed and implemented to build a phoneme-to-pose dictionary from any video, such as general video, purposely recorded video, or both. With as few as 44 words or 20 sentences, embodiments can build a phoneme-to-pose dictionary that contains all phonemes in English.

To generate natural pose sequences and videos, embodiments may include interpolation and smoothness methods for pose sequences and may further utilize a GAN-based video generation network to convert sequences of poses to photorealistic videos.

B. Some Related Work

1. Text-Driven Video Generation

There are some earlier works on mapping between phonemes and visemes and generating visual speech by interpolating between visemes. For example, Ezzat and Poogio introduced MikeTalk, a text-to-audiovisual speech synthesizer intended to convert input text into an audiovisual speech stream (Tony Ezzat and Tomaso Poggio. Visual speech synthesis by morphing visemes. *International Journal of Computer Vision,* 38(1):45-57, 2000.). Others (Sarah L. Taylor, Moshe Mahler, Barry-John Theobald, and Iain Matthews. Dynamic units of visual speech. In *Proceedings of the 11th ACM SIGGRAPH/Eurographics conference on Computer Animation,* pages 275-284, 2012) proposed a method for automatic redubbing of video that exploits the many-to-many mapping of phoneme sequences to lip movements modeled as dynamic visemes.

2. Audio-Driven Video Generation

Audio-driven Video Synthesis (Speech2Video) is to drive movements of human bodies with input audio. It mainly consists of mouth movement and upper body movement. All those movements should be smooth, natural, and synchronized with input audio. Otherwise, even minor artifacts are relatively easy to be detected by a human viewer.

A significant amount of exciting work has been done in the area of audio-driven video generation. For example, SythesisObama (Supasorn Suwajanakorn, Steven M. Seitz, and Ira Kemelmacher-Shlizerman. SynthesizingObama: Learning Lip Sync from Audio. *ACM Transactions on Graphics (TOG),* 36(4):95, 2017) (hereinafter, Suwajanakorn et al. (2017)) focused on synthesizing a talking-head video by driving mouth motion with speech using a recurrent neural network (RNN). A mouth sequence was first generated via texture mapping and then pasted onto an existing human speech video. However, SythesisObama needs approximately 17 hours of training data for one person, so it is not scalable.

Taylor introduced a deep learning approach using sliding window regression for generating realistic speech animation (Sarah Taylor, Taehwan Kim, Yisong Yue, Moshe Mahler, James Krahe, Anastasio Garcia Rodriguez, Jessica Hodgins, and Iain Matthews. A deep learning approach for generalized speech animation. *ACM Transactions on Graphics (TOG),* 36(4):1-11, 2017). However, their animation predictions are made in terms of the reference face active appearance model (AAM) parameterization, which retargeting to a character introduces a potential source of errors. Yet others proposed a method to learn individual styles of speech gesture in two stages (Shiry Ginosar, Amir Bar, Gefen Kohavi, Caroline Chan, Andrew Owens, and Jitendra Malik. Learning Individual Styles of Conversational Gesture. In *Proceedings of the IEEE Conference on Computer Vision and Pattern Recognition,* pages 3497-3506, 2019) (hereinafter, Ginosar et al. (2019)). However, final generated videos from their rendering stage have a few artifacts.

Some have developed a 3D face model by audio and rendered the output video using a technique called neural rendering (Justus Thies, Mohamed Elgharib, Ayush Tewari, Christian Theobalt, and Matthias Nießner. Neural Voice Puppetry: Audio-Driven Facial Reenactment. *arXiv preprint arXiv:*1912.05566, 2019) (hereinafter, Thies et al. (2019)). They proposed Audio2ExpressionNet, a temporal network architecture to map an audio stream to a 3D blend shape basis representing person-specific talking styles. This method needs a long time to train a model.

Previously, mouth movement synthesis is mostly deterministic: given a pronunciation, the mouth's movement or shape is similar across different persons and contexts. Alternately, Liao et al. proposed a novel 2-stage pipeline of generating an audio-driven virtual speaker with full-body movements (Miao Liao, Sibo Zhang, Peng Wang, Hao Zhu, and Ruigang Yang. Personalized Speech2Video with 3D Skeleton Regularization and Expressive Body Poses. *arXiv preprint arXiv:*2007.09198, 2020) (hereinafter, Liao et al. (2020)). Their method was able to add personalized gestures in the speech by interpolating key poses. They also utilized 3D skeleton constraints to guarantee that the final video is physically plausible. However, this method is audio-based and has the limitations as mentioned earlier.

3. Text-Based Video Editing

Text-based Video Editing attempts to address a similar task as embodiments herein. Text-based Mouth Editing is a method to overwrite an existing video with new text input (Ohad Fried, Ayush Tewari, Michael Zollhöfer, Adam Finkelstein, Eli Shechtman, Dan B Goldman, Kyle Genova, Zeyu Jin, Christian Theobalt, and Maneesh Agrawala. Text-Based Editing Of Talking-Head Video. *arXiv preprint arXiv:* 1906.01524, 2019). The method conducts a viseme search to find video segments with mouth movements matching the edited text. The selected video segments' corresponding face parameters are blended with the original sequence parameters to synthesize photo-realistic videos. However, there are some limitations of the method, including: 1) their synthesis approach requires a retimed background video as input; 2) their phoneme retrieval is agnostic to the mood in which the phoneme was spoken; 3) it requires a one-hour long training sequence of the target character; and 4) testing speed is slow since the viseme search is time-consuming. In addition, it cannot generate videos from any input text.

4. Text-To-Speech (TTS)

Text-to-speech (TTS) is the process of converting written text into speech. Traditional TTS has two components: a front-end text-analysis component to predict phonetic representations from text, and a back-end speech-synthesis component to generate speech from the phonetic representations by rule-based, parametric, or concatenative methods. In recent years, neural TTS has tremendously improved the quality of synthetic speech. In neural TTS, the traditional hand-engineered text-analysis pipelines are replaced with learned neural text encoders. The synthetic speech is generated autoregressively at every time step. State-of-the-art neural TTS systems employ attention-based sequence-to-sequence (seq2seq) neural networks. Most of the systems generate Mel spectrogram from the text first and use a neural vocoder to synthesize waveform.

5. Pose Estimation and Video Generation

OpenPose has represented the first real-time multi-person system to jointly detect human body, hand, facial, and foot keypoints on single images (Zhe Cao, Gines Hidalgo, Tomas Simon, Shih-En Wei, and Yaser Sheikh. OpenPose: Realtime Multi-Person 2D Pose Estimation Using Part Affinity Fields. In *arXiv preprint arXiv:*1812.08008, 2018).

Vid2vid learned a mapping that converts a semantic video to a photorealistic video (Ting-Chun Wang, Ming-Yu Liu, Jun-Yan Zhu, Guilin Liu, Andrew Tao, Jan Kautz, and Bryan Catanzaro. Video-To-Video Synthesis. In *Advances in Neural Information Processing Systems (NeurIPS),* 2018). In this study, the semantic label maps are image frames of the human skeleton. A core of video-to-video translation is image-to-image translation (Phillip Isola, Jun-Yan Zhu, Tinghui Zhou, and Alexei A Efros. Image-To-Image Translation with Conditional Adversarial Networks. In *Computer Vision and Pattern Recognition (CVPR),* 2017 *IEEE Conference on,* 2017). Vid2vid has at least two major limitations. First, training a model needs many images of a target subject or a scene. Second, a learned model cannot generalize to other tasks. To apply a learned model to other targets, few-shot vid2vid proposed to learn a subject-agnostic mapping that converts a semantic video and an example image to a photo-realistic video.

6. Lip-Syncing

Synchronization of synthesized motion with the input audio is essential. Wav2Lip is a state-of-the-art (SOTA) method in this area, which is a lip-synchronization network for lip-syncing random talking face videos in the wild with random speech (K R Prajwal, Rudrabha Mukhopadhyay, Vinay P Namboodiri, and C V Jawahar. A Lip-Sync Expert is All You Need for Speech to Lip Generation in the Wild. In *Proceedings of the 28th ACM International Conference on Multimedia*, pages 484-492, 2020).

C. Text-To-Video (Text2Video) Embodiment

1. Training Embodiments

Embodiments comprise two main components: a phoneme-pose dictionary and a model to generate video from phoneme poses. FIG. 1 depicts a general methodology for training and deploying a Text2Video system, according to embodiments of the present disclosure. In one or more embodiments, a phoneme-pose dictionary is built (105) from training data (audio and video of speech). A text-to-video (Text2Video) generative model is trained (110) to generate video from phoneme poses. Given the phoneme-pose dictionary and the trained generative model, the trained generative system can be deployed (115), in which that system receives text as an input and outputs a generated video of a person speaking the contents of the input text.

a) Phoneme-Pose Dictionary Embodiments

Phonemes are the basic units of the sound structure of a language. They are produced with different positions of the tongue and lips, for example, with lips rounded (e.g., /u/) or spread (e.g., /i/), or wide open (e.g., /a/) or closed (e.g., /m/).

English has 40 phonemes if one does not count lexical stress. The phonemes are listed in List 1 (below). There are three levels of lexical stress in English: primary stress, secondary stress, and unstress. Stress may have an influence on the position of the lips in speech production. For example, the vowel 'er' in the word permit is stressed when the word is a noun and is unstressed when it is a verb. The mouth is slightly more open when pronouncing the stressed 'er'. Therefore, in one or more embodiments, stress was distinguished in the English phoneme-pose dictionary.

List 1: English phonemes in ARPABET and IPA

| No. | ARPABET | IA | Examples | No. | ARPABET | IPA | Examples |
|---|---|---|---|---|---|---|---|
| 1 | IY | i | b*ea*t | 21 | M | m | *m* om |
| 2 | IH | ɪ | b*i* t | 22 | N | n | *n* one |
| 3 | EH | ɛ | b*e* t | 23 | NG | ŋ | si*ng* |
| 4 | AE | ae | b*a* t | 24 | CH | tʃ | *ch* urch |
| 5 | AH | ʌ | b*u* tt | 25 | JH | dʒ | *j* udge |
| 6 | AX | ə | th*e* | 26 | B | b | *b* ob |
| 7 | UW | u | b*oo* t | 27 | P | p | *p* op |
| 8 | UH | ʊ | b*oo* k | 28 | D | d | *d* ad |
| 9 | AO | ɔ | b*ou* ght | 29 | T | t | *t* otal |
| 10 | AA | ɑ | c*a* r | 30 | G | g | *g* ood |
| 11 | ER | ɝ | b*ir* d | 31 | K | k | *k* ick |
| 12 | EY | eɪ | b*ai* t | 32 | Z | z | *z* oo |
| 13 | AY | aɪ | b*i* te | 33 | S | s | *s* ister |
| 14 | OY | ɔɪ | b*o* y | 34 | ZH | ʒ | mea*s* ure |
| 15 | AW | aʊ | ab*ou* t | 35 | SH | ʃ | *sh* oe |
| 16 | OW | oʊ | b*oa* t | 36 | V | v | *v* ery |
| 17 | L | l | *l* ed | 37 | F | f | *f* eet |
| 18 | R | ɹ | *r* ed | 38 | DH | ð | *th* ey |
| 19 | Y | j | *y* et | 39 | TH | θ | *th* ink |
| 20 | W | w | *w* et | 40 | H | h | *h* ay |

For Mandarin Chinese, embodiments use initials and finals as the basic units in the phoneme-pose dictionary. This is because phonemes in the finals in Chinese are more blended together and do not have a clear boundary between each other. List 2 is a list of Mandarin initials and finals. Phoneme-pose dictionaries were built for English and Mandarin Chinese, mapping from phonemes to lip postures extracted from a speech production video.

List 2: Initials and Finals (in Pinyin) in Mandarin Chinese:

| Initials | b p m f d t n l g k h z c s zh ch sh r j q x |
|---|---|
| Finals | without a medial: |
| | a o e i (as in zi/ci/si) i (as in zhi/chi/shi/ri) |
| | er ai ei ao on an en ang eng ong |
| | with a medial [i]: |
| | i ia iao ie iu ian in iang ing iong |
| | with a medial [u]: |
| | u ua uo uai ui an un uang ueng |
| | with a medial [ü]: |
| | ü, üe, üan, ün |

Figure 2:
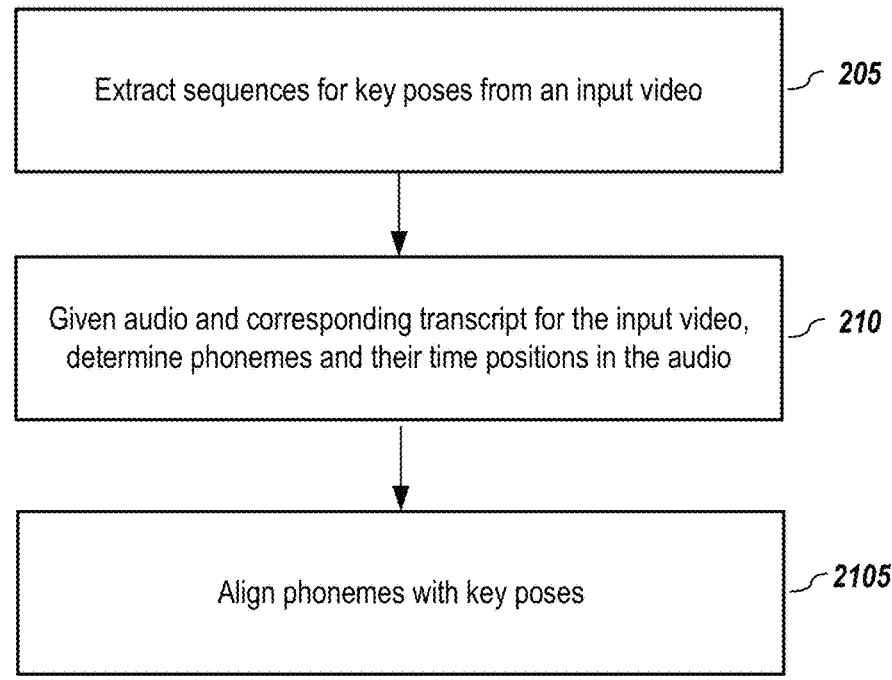
FIG. 2 comprises an overview methodology for generating a phoneme-pose dictionary, according to embodiments of the present disclosure.

FIG. 2 comprises an overview methodology for generating a phoneme-pose dictionary, according to embodiments of the present disclosure. In one or more embodiments, the process comprises extracting (205) sequences of one or more frames for each key pose in each input video from a set of training videos. Given audio and corresponding transcript for an input training video, the phonemes and their time positions in the audio are determined (210). Given the identified phonemes and timing information, the identified phonemes are aligned (215) with their corresponding key pose sequences using the time positions.

Figure 3:
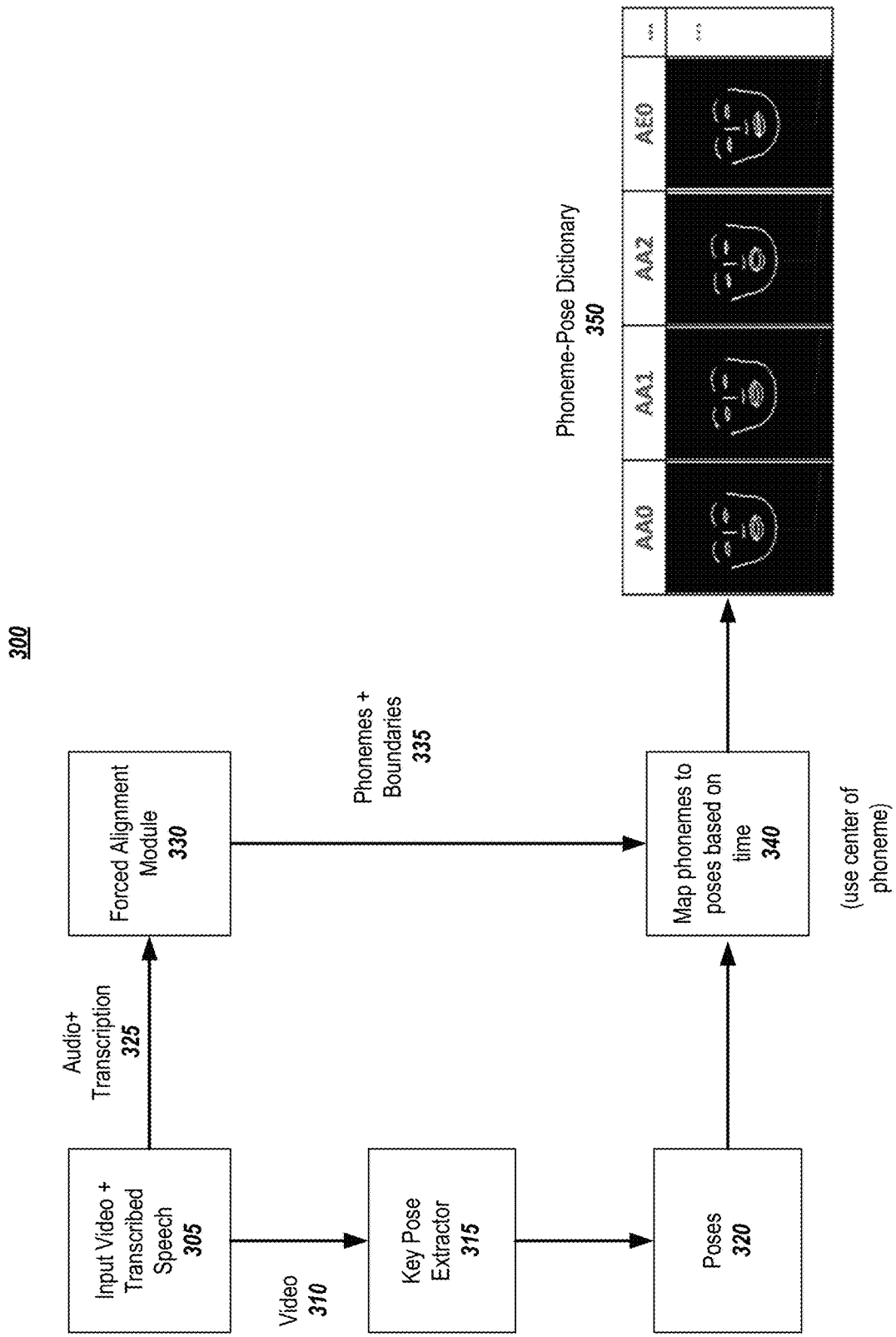
FIG. 3 depicts a system and flow for generating a phoneme-pose dictionary, according to embodiments of the present disclosure.

FIG. 3 depicts a system and flow for generating a phoneme-pose dictionary, according to embodiments of the present disclosure.

Key pose extraction. Given an input video 305, key pose sequences are extracted from the video 310 using a key pose extractor 315 to obtain a set of key pose sequences 320 for the video. In one or more embodiments, OpenPose (Zhe Cao, Gines Hidalgo, Tomas Simon, Shih-En Wei, and Yaser Sheikh. OpenPose: Realtime Multi-Person 2D Pose Estimation Using Part Affinity Fields. In *arXiv preprint arXiv: 1812.08008*, 2018) may be implemented as the key pose extractor 315 for extracting key poses from training videos. It should be noted that other tools or methods may be used to extract key pose sequences from videos.

Phoneme extraction. Given audio from the input video and a corresponding transcript 315 of the audio from the input video, phonemes are extracted and their time position identified (335). In one or more embodiments, an aligner may be employed (e.g., the Penn Phonetics Lab Forced Aligner (P2FA) aligner (J. Yuan and M. Liberman. Speaker Identification on the SCOTUS Corpus. *The Journal of the Acoustical Society of America*, 123:3878, 2008) to determine phonemes and their time positions in the audio; although other aligning systems or methods may also be employed. As noted above, two inputs—audio and word transcriptions—are used. The transcription may be part of the training data 305 or may be obtained, such as by using a speech-to-text system (not shown). In one or more embodiments, the transcribed words are mapped into a phone sequence using a pronouncing dictionary and/or grapheme-to-phoneme rules. Phone boundaries may be determined by comparing the observed speech signal and pre-trained, Hidden Markov Model (HMM) based acoustic models. In forced alignment, the speech signal is analyzed as a successive set of frames (e.g., every 10 ms). The alignment of frames with phonemes may be determined by finding the most likely sequence of hidden states (which may be constrained by the known sequence of phonemes derived from transcription) given the observed data and the acoustic models represented by the HMMs. An embodiment of forced alignment process and system is illustrated in FIG. 4 with an example text word "this".

Figure 4:
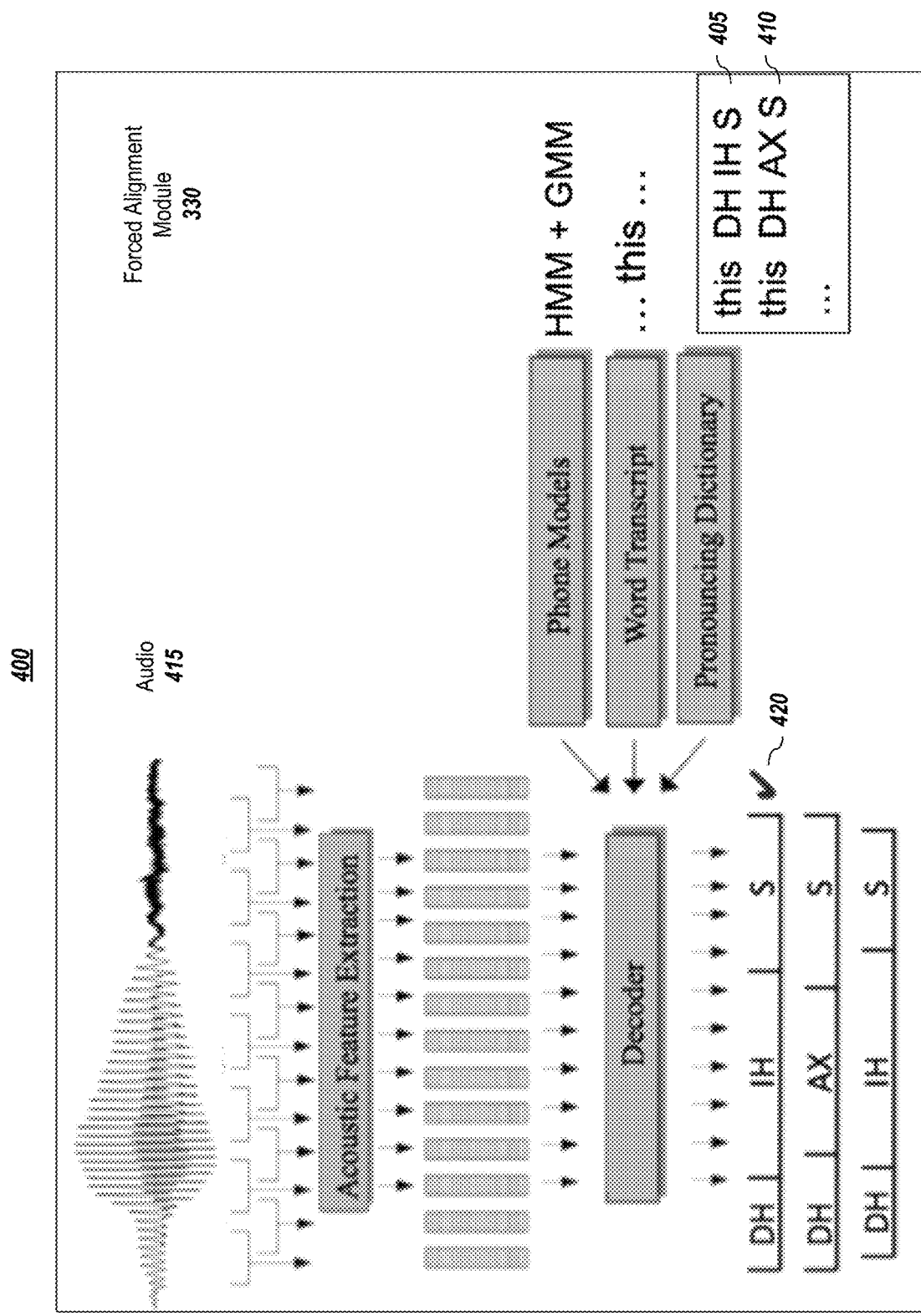
FIG. 4 illustrates a forced alignment process and system, according to embodiments of the present disclosure.

As illustrated in FIG. 4, the boundaries of the phonemes in the word "this" are determined through forced alignment of acoustic frames and pre-trained acoustic models—Hidden Markov Model (HMM) and Gaussian Mixture Model (GMM). Note that "this" has more than one possible pronunciation (e.g., pronunciations 405 and 410); the alignment selects a pronunciation 420 that best matches the acoustic signal from the input audio 415, which pronunciation comprises three phonemes "DH", "IH", "s". The aligner 400 also outputs timestamps of these three phonemes.

Returning to FIG. 3, the phonemes with their identified temporal boundaries are mapped to the key pose sequences using the time positions/timestamps. In one or more embodiments, each unique phoneme and its corresponding key pose sequence is added to the phoneme-pose dictionary 350.

In one or more embodiments, input videos were captured at 25 frames per second (fps). For embodiments, motion width was set equal to 3 frames, which means each phoneme has a 7-frame sequence (2 times motion width+1 frame) in the phoneme pose dictionary. In one or more embodiments, motion width may be set to depend on video frame rate and average speaker rate.

b) Video Generation Embodiments

Figure 5:
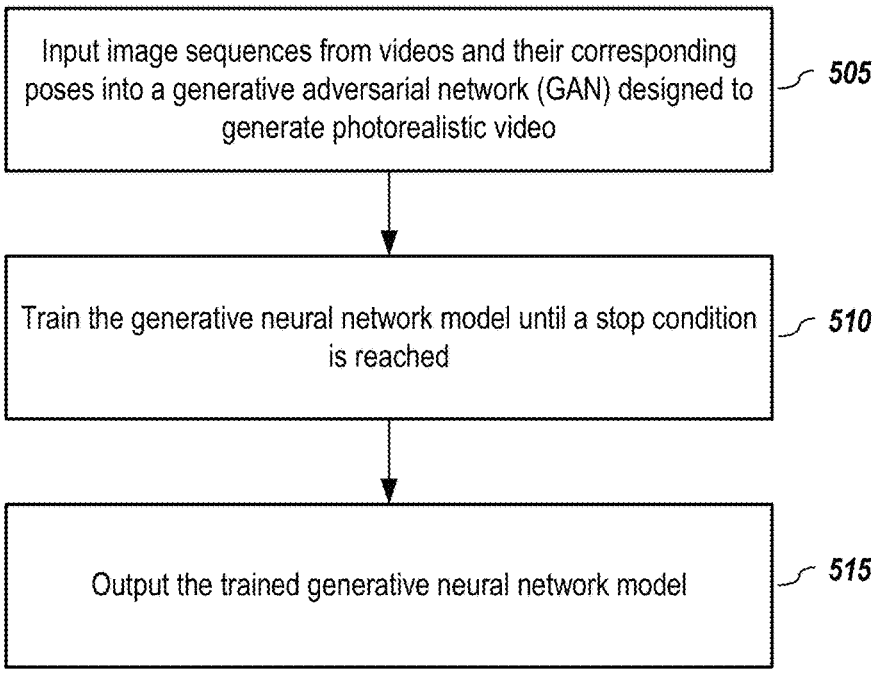
FIG. 5 depicts a method for obtaining a model that generates a video from phoneme poses, according to embodiments of the present disclosure.
Figure 6:
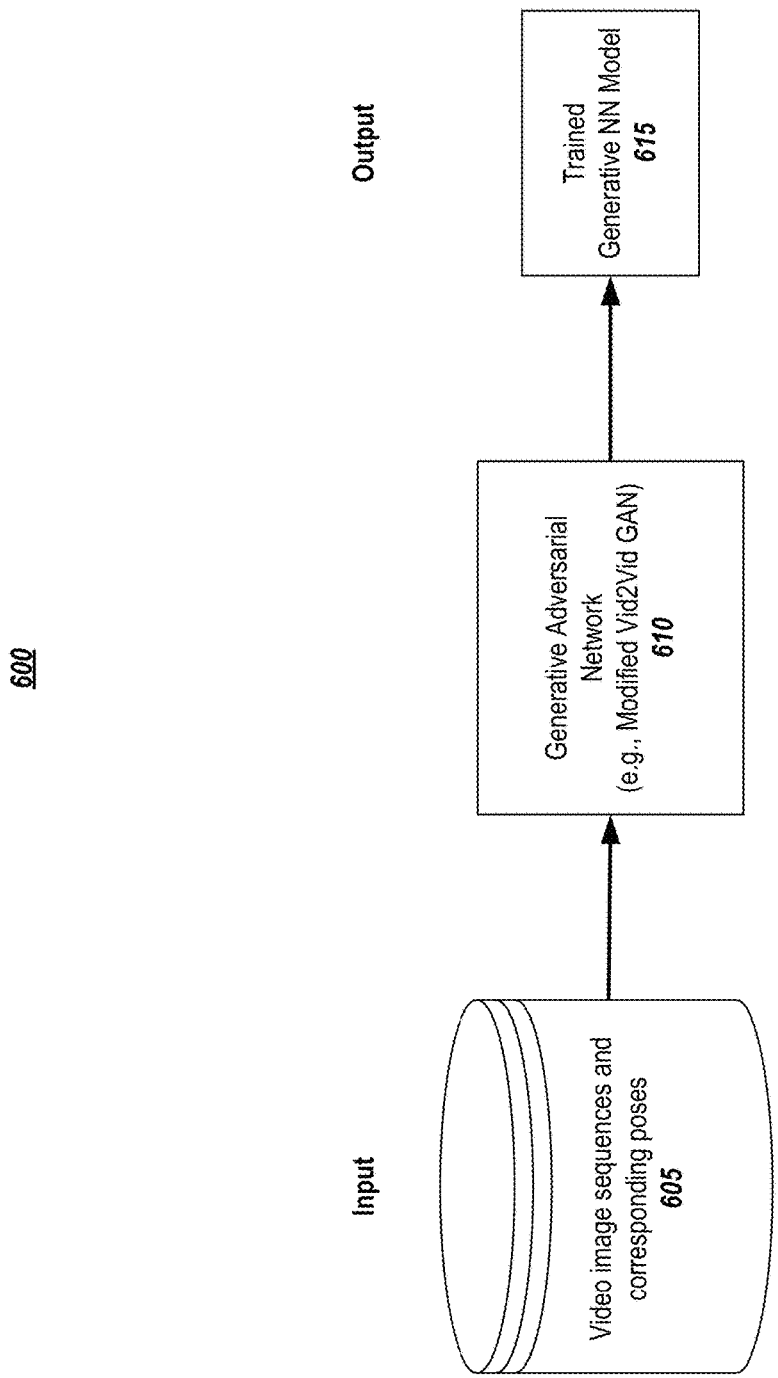
FIG. 6 graphically depicts a system and flow for obtaining a trained generative neural network that generates a video from phoneme poses, according to embodiments of the present disclosure.

FIG. 5 depicts a method for obtaining a model that generates a video from phoneme poses, according to embodiments of the present disclosure. FIG. 6 graphically depicts a system 600 and flow for obtaining a trained generative neural network that generates a video from phoneme poses, according to embodiments of the present disclosure.

As illustrated, a dataset 605 of training image sequences and their corresponding poses are input (505) into a generative adversarial network (GAN) (610) that is designed to generate photorealistic video. In one or more embodiments, the image sequences and the corresponding poses may be selected from the training videos and poses used to generate the phoneme-pose dictionary as discussed above. Alternatively, or additionally, other dataset of video sequences and corresponding poses may be used.

In one or more embodiments, the GAN system may be a vid2vid system, which is discussed in Speech2Video (Miao Liao, Sibo Zhang, Peng Wang, Hao Zhu, and Ruigang Yang. Personalized Speech2Video with 3D Skeleton Regularization and Expressive Body Poses. In *arXiv preprint arXiv: 2007.09198, 2020*) and vid2vid (Ting-Chun Wang, Ming-Yu Liu, Jun-Yan Zhu, Guilin Liu, Andrew Tao, Jan Kautz, and Bryan Catanzaro. Video-To-Video Synthesis. In *Advances in Neural Information Processing Systems (NeurIPS), 2018)*— although it should be noted that other systems may also be employed. In one or more embodiments, the GAN network may be modified to put more weight on the face to emphasize the face and mouth.

In one or more embodiments, to make a vid2vid network put more emphasis on generating face details, the network and input images are modified. Specifically, a color circle is drawn on the face of an input skeleton image. Within the network, an image is output from the generative network given an input image. Before it is passed to discriminator network, regions of face are located by their special colors in the input image. Then, a sub-image is cropped from the generated image and pass it to the discriminator network along with the entire output image. The loss weights for those sub-images are tuned to make sure the discriminator is pickier on the reality of the generated face images.

The generative neural network model is trained (510) until a stop condition is reached, and the trained generative neural network model 615 is output (515).

The trained generative network 615 is used to convert pose sequences into human speech videos in Text2Video embodiments.

2. Trained Text2Video Embodiments a) Trained Text2Video System Embodiments

Figure 7:
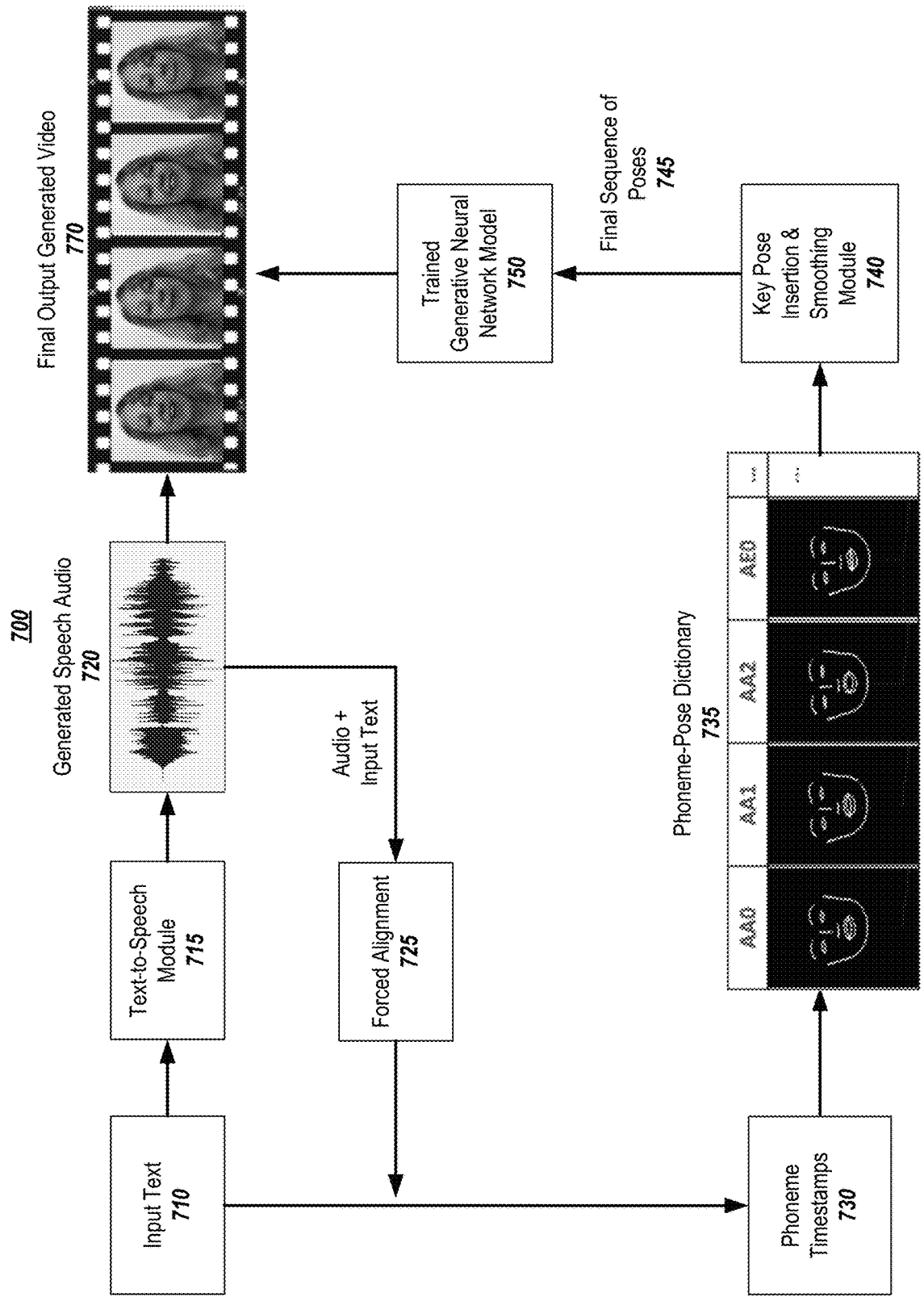
FIG. 7 graphically depicts a pipeline for a Text2Video system, according to embodiments of the present disclosure.

FIG. 7 graphically depicts a pipeline for a Text2Video system, according to embodiments of the present disclosure. By way of general overview, as shown in FIG. 7, the input to the system 700 is text 710, which can be words (e.g., English words, Chinese words, etc.), numbers, and punctuation, and the output is generated video 770 of a talking human.

More specifically, given an input text 710, the depicted Text2Video embodiment generates speech audio 720 from the input text 710. In one or more embodiments, the speech audio is generated using a text-to-speech (TTS) system 715. The depicted Text2Video embodiment 700 also aligns the phonemes in the input text with the time occurrences in the speech audio (e.g., using forced alignment 725) and also looks-up poses in a phoneme-pose dictionary 735 using the phonemes. In one or more embodiments, a key pose interpolation and smooth module 750 using the sequences of poses and their timings to generate a final sequence of poses 745. The final sequence of poses is input into a trained generative neural network model that generates a photorealistic video, which is combined with the generated audio 720, to generate the final output video 770.

b) Deployment/Inference Method Embodiment

Figure 8:
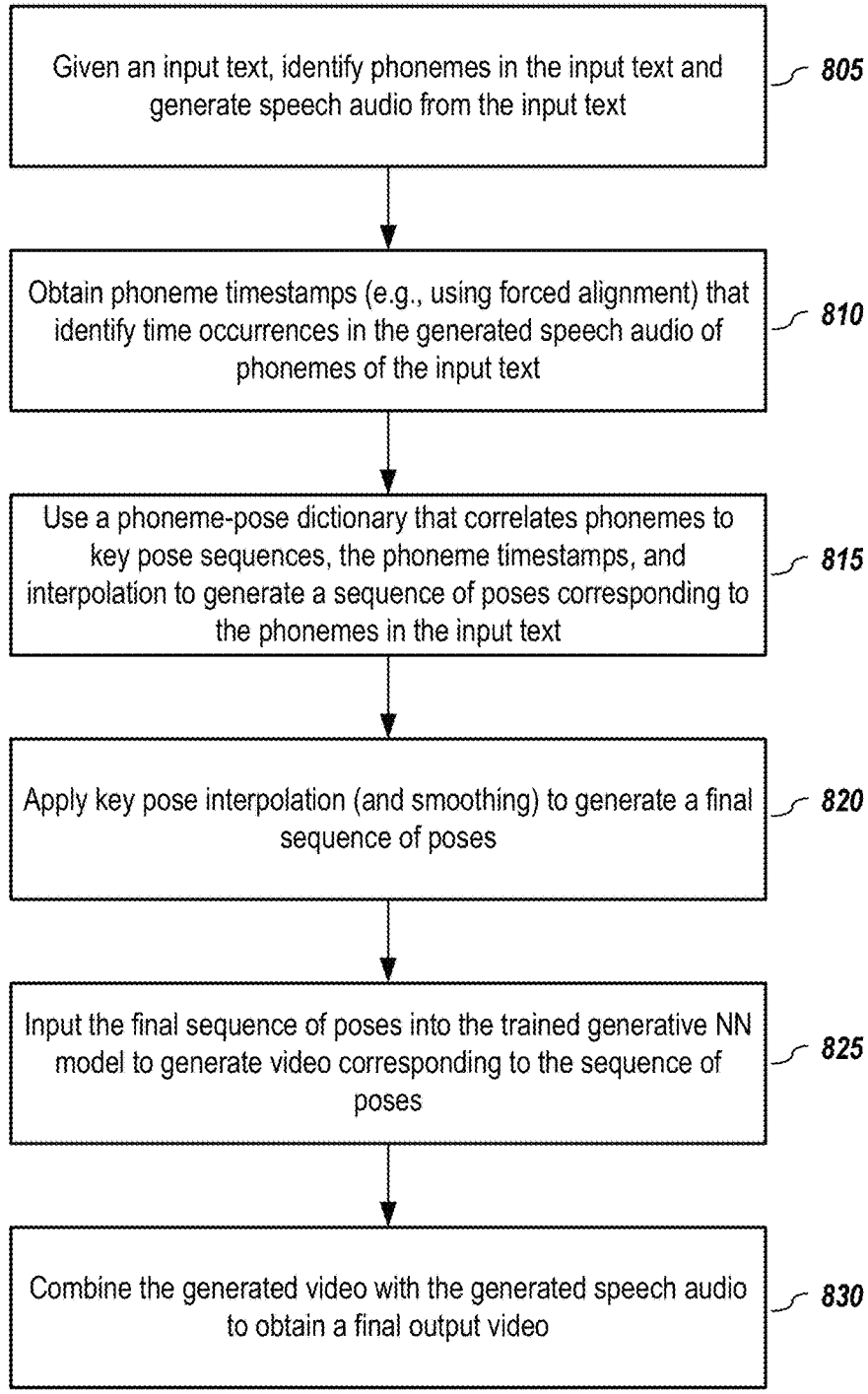
FIG. 8 depicts an alternative methodology for using a trained text-to-video system to generate a video given an input text, according to embodiments of the present disclosure.

FIG. 8 depicts an alternative methodology for using a trained text-to-video system to generate a video given an input text, according to embodiments of the present disclosure. In one or more embodiments, given an input text (e.g., input text 710 in FIG. 7), phonemes in the input text are identified (805). As noted above, the process of identifying phonemes in the input text may be performed by mapping words in the input text into phonemes using a pronouncing dictionary, grapheme-to-phoneme rules, or both. Also, speech audio is generated (805) from the input text. In one or more embodiments, a text-to-speech (TTS) system 715 is used to generate the speech audio 720.

(i) Text-To-Speech (TTS) System Embodiments

As noted above, in one or more embodiments, a test-to-speech (TTS) system is used to convert an input text into a corresponding speech audio. While any high-quality TTS system may be used, embodiment herein used a Baidu TTS system to generate audio from text input, such as described in U.S. patent application Ser. No. 16/654,955, filed on Oct. 16, 2019, entitled "PARALLEL NEURAL TEXT-TO-SPEECH," listing Kainan Peng, Wei Ping, Zhao Song, and Kexin Zhao as inventors, which is a continuation-in-part application of and claims priority benefit of co-pending and commonly-owned to U.S. patent application Ser. No. 16/277,919, filed on Feb. 15, 2019, entitled "SYSTEMS AND METHODS FOR PARALLEL WAVE GENERATION IN END-TO-END TEXT-TO-SPEECH," listing Wei Ping, Kainan Peng, and Jitong Chen as inventors, which is a continuation-in-part application of and claims priority benefit of co-pending and commonly-owned to U.S. patent application Ser. No. 16/058,265, filed on Aug. 8, 2018, entitled "SYSTEMS AND METHODS FOR NEURAL TEXT-TO-SPEECH USING CONVOLUTIONAL SEQUENCE LEARNING," listing Sercan Arik, Wei Ping, Kainan Peng, Sharan Narang, Ajay Kannan, Andrew Gibiansky, Jonathan Raiman, and John Miller as inventors, which claimed priority under 35 U.S.C. § 119(e) to U.S. Provisional Application No. 62/574,382, filed on Oct. 19, 2017, entitled "SYSTEMS AND METHODS FOR NEURAL TEXT-TO-SPEECH USING CONVOLUTIONAL SEQUENCE LEARNING," listing Sercan Arik, Wei Ping, Kainan Peng, Sharan Narang, Ajay Kannan, Andrew Gibiansky, Jonathan Raiman, and John Miller as inventors. Each patent document is incorporated in its entirety by reference herein and for all purposes, and a TTS system described in any of the above-mentioned patent documents may be employed.

The system's default female and male voices are used. For personalized video generation, one can use any technique to generate a voice of his/her own choice. From embodiments herein, the voice of a different person will not affect the generated video quality.

Returning to FIG. 8, phoneme timestamps are obtained (810) that identify time occurrences in the generated speech audio of phonemes of the input text. In one or more embodiments, a process similar to that performed in generating the phoneme-pose dictionary may be used to obtain the timing information—e.g., using forced alignment 725 to align the phonemes in the input text with corresponding phonemes in the generated speech audio to obtain the phoneme timestamps. The phoneme-pose dictionary 735, which correlates phonemes to key pose sequences, is used (815) in conjunction with the phoneme timestamps and interpolation to generate a sequence of poses corresponding to the phonemes in the input text.

In one or more embodiments, the sequence of poses may be used directly as an input into a trained generative neural network model 750 to generate a video; alternatively, one or more interpolations and/or smoothing operations may be performed (820) to generate a final sequence of poses 745, which is used by the trained generative neural network to generate video.

Finally, the generated video is combined (830) with the generated speech audio to obtain a final output video 770.

(ii) Key Pose Sequence Interpolation & Smoothing Embodiments

To generate a sequence of poses, in one or more embodiments, key pose insertion is used add missing poses between key poses or blend existing poses. In one or more embodiments, the key pose insertion module 740 goes through all phonemes one-by-one in the speech/input text and finds their corresponding key pose sequences in the phoneme-pose dictionary 735. Given all the key pose sequences and their corresponding timings, when a key pose is inserted into a sequence of poses, an interpolation is performed in their pose parameter space. In experiments conducted using Text2Video embodiments, the video frame rate was 25 fps. In one or more embodiments, there are at least three parameters to affect the interpolation strategies: motion width (which represents the number of frames for a key pose sequence extracted from the phoneme-pose dictionary for each phoneme), minimum key pose distance (which may be defined as the minimum number of frames between adjacent key pose sequences, or which may be defined as a parameter that identifies when interpolation should be performed between key pose sequences), and transition width (i.e., when interpolation is to be performed, transition width may be used to affect interpolation strategy as a parameter of interval distance, which may be defined, for example, as 2×motion width+transition width). In one or more embodiments, a phoneme poses width may be set to 7 frames, which means for each phoneme a 7-frame pose sequence in the phoneme pose dictionary is extracted. A motion width may be set to 3 frames, transition width set to 5 frames, and minimum key pose distance set to equal 3 frame. It shall be noted that these values are a specific implementation example, and one or more different values may be set for different implementations.

Figure 9A:
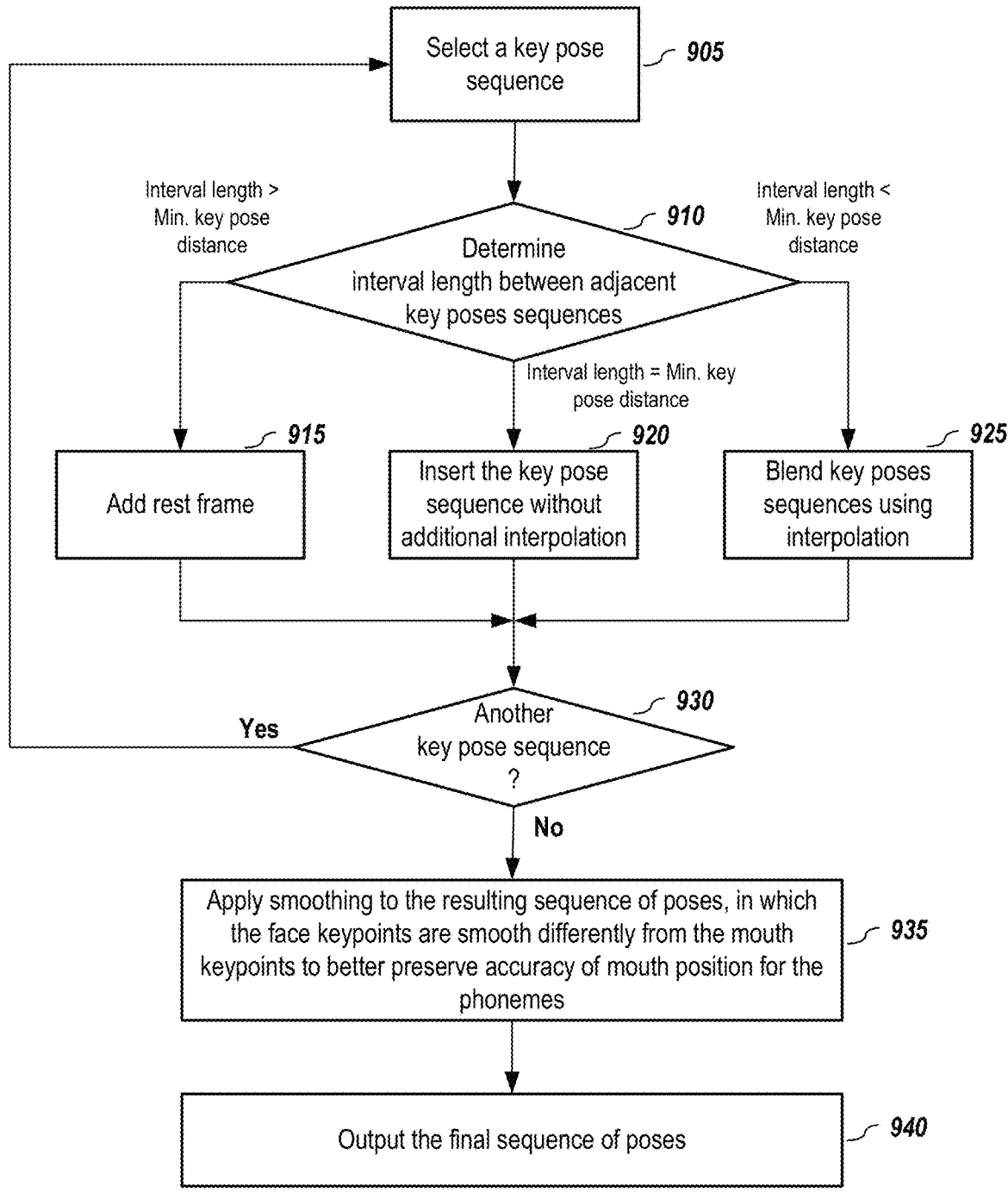
FIG. 9A depicts a set of interpolation strategies, according to embodiments of the present disclosure.

FIG. 9A depicts a set of interpolation strategies 900A, according to embodiments of the present disclosure. Given the timing of the phonemes, the sequence of key poses can be ordered according to their corresponding timestamp. In one or more embodiments, starting at the first two adjacent key pose sequences, a determination is made (910) based upon the interval distance between the two adjacent key pose sequences. The distance measure may be based upon different points; in embodiments, a key pose sequence is an odd number of frames and the central frame in the key pose sequence is used to measure the interval distance between key pose sequences. In one or more embodiments, the interval distance may be set as 2×motion width+transition width, although other distance measures may be used.

In one or more embodiments, if the interval length between two phoneme key pose frame sequences is larger than minimum key pose distance, one or more rest frames are added (915). In one or more embodiments, a rest frame is the idle frame when speaker is not speaking. The key pose sequence and the added rest frame(s) may be output to a sequence of poses.

In one or more embodiments, if the interval distance between two adjacent phonemes is equal to the interval distance, the key pose sequence may be output (920) directly to the sequence of poses.

Figure 10A:
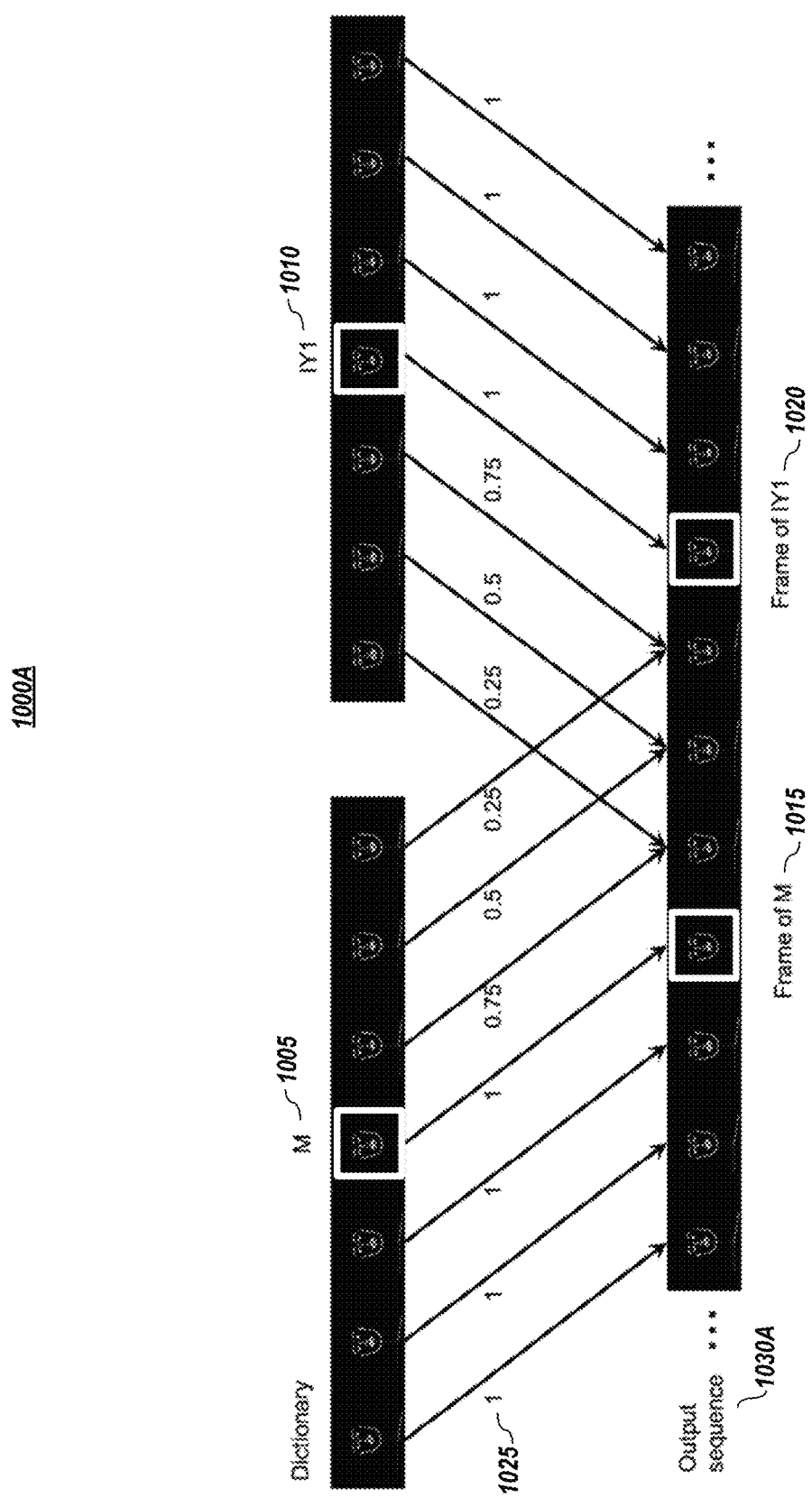
FIG. 10A illustrates an example interpolation methodology with weighted sums of phoneme poses, according to embodiments of the present disclosure.

In one or more embodiments, if the interval distance between two adjacent phonemes is smaller than the minimum interval distance, the two adjacent key pose sequences may be blended (925). For example, in one or more embodiments, the motion width is reduced to interval length−1, and an interpolation method may be applied to blend the sequences. FIG. 10A illustrates an example interpolation methodology with weighted sums of phoneme poses, according to embodiments of the present disclosure. The new frames in the output sequence are interpolated between two key pose frames (e.g., the central frames of each key pose sequence), weighted by their distance to those two key pose frames. In one or more embodiments, weight is inverse proportional to the distance with a keyframe—which means the large the distance, the smaller the weight.

As illustrated in FIG. 10A, to generate output sequence for the text word "me," which is "M IY1" in phonemes, the two key pose sequences ("M" 1005 and "IY1" 1010) are obtained from the phoneme-pose library. FIG. 10A shows the case of the interval between two phonemes is smaller than length of the interval distance or length (e.g., 2×motion width+transition width); thus, the two key pose sequences 1005 and 1010 are blended. Note that the central frames in the key pose sequences (outlined in white boxes) are weighted with "1" to keep their full value; whereas interpolation with a weighted sum of phoneme poses for the frames in between the central frames is used. In one or more embodiments, the weight 1025 is determined by the distance to one key pose divide by the interval length of two key frames.

Returning to FIG. 9A, the process continues by determining whether another key pose sequence is to be processed (930). If another key pose sequence is to be processed, the method returns to step 905 and the process repeats. If there are no more key pose sequences for processing, a final sequence of poses is output (940). However, in one or more embodiments, it may be beneficial to smooth the resulting sequence of poses before outputting the final sequence. Accordingly, in one or more embodiments, smoothing is applied (935) to the resulting sequence of poses, in which the face keypoints may be smooth differently from the mouth keypoints to better preserve accuracy of mouth position for the phonemes.

Figure 9B:
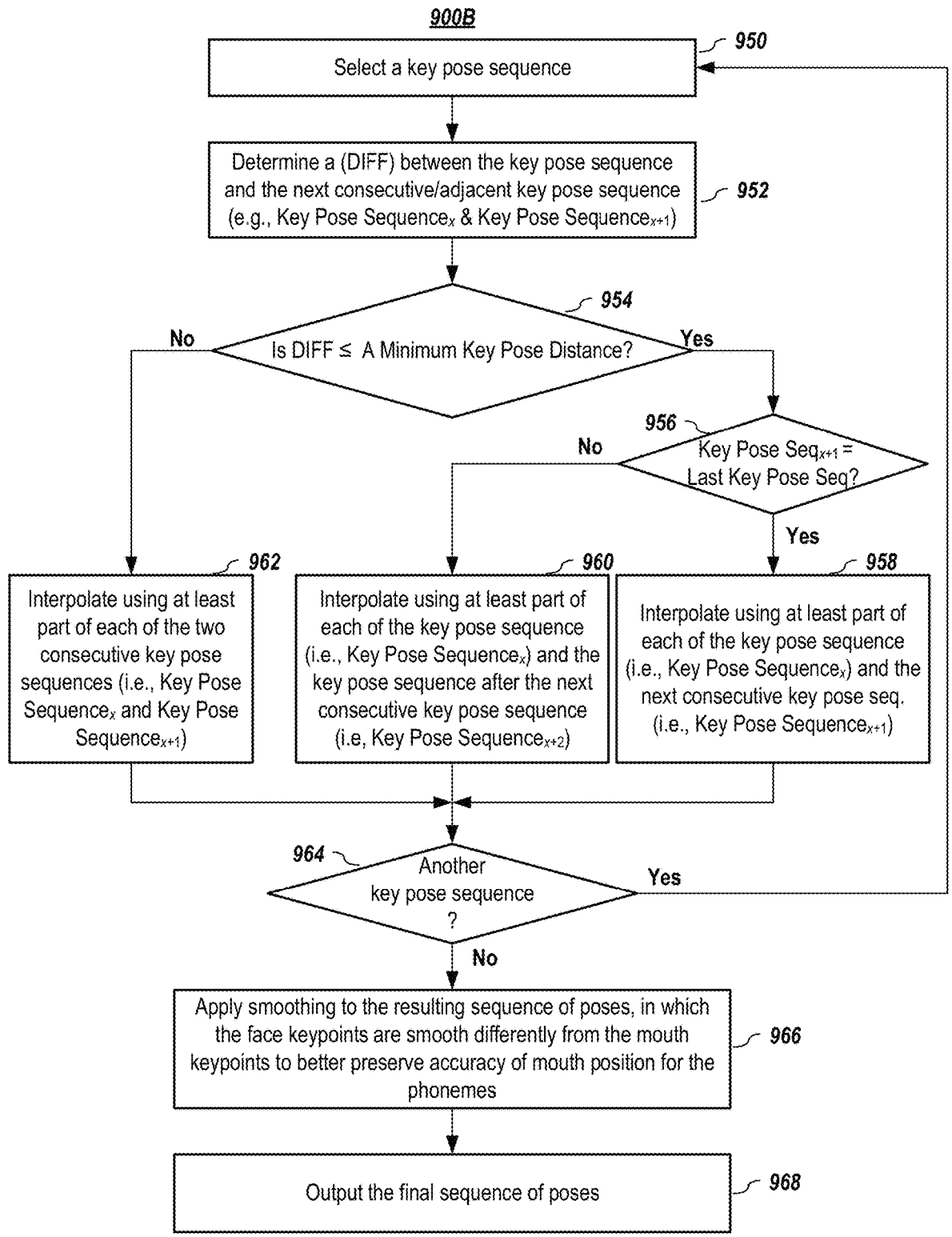
FIG. 9B depicts additional and/or alternative interpolation strategies, according to embodiments of the present disclosure.

FIG. 9B depicts additional and/or alternative interpolation strategies, according to embodiments of the present disclosure. As shown, a key pose sequence is selected (950)—typically starting with the first key pose sequence chronically. In one or more embodiments, a difference value (DIFF) is determined (954) between the key pose sequence and the next consecutive key pose sequence (i.e., the adjacent key pose sequence). By way of illustration, consider FIG. 10B.

Figure 10B:
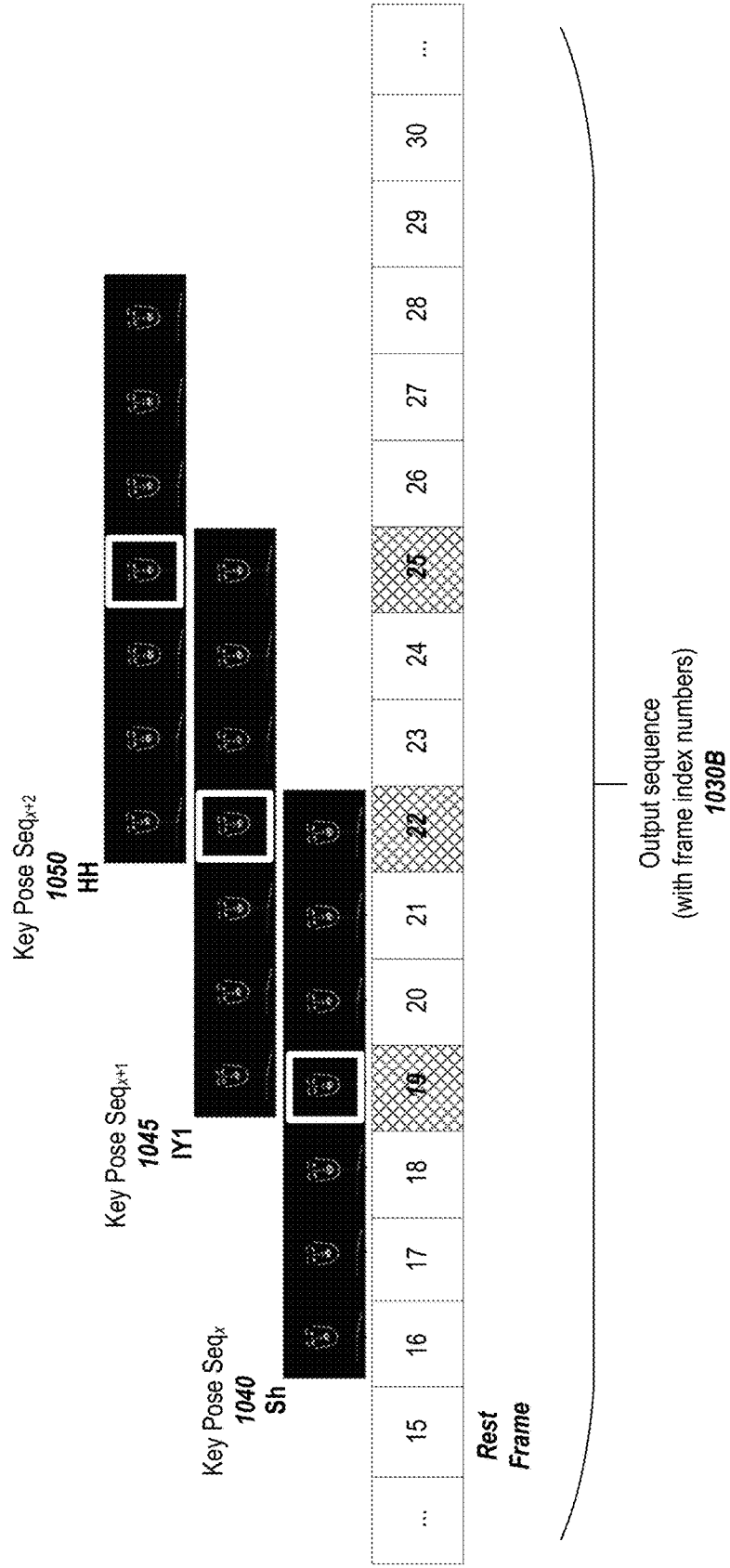
FIG. 10B illustrates an example interpolation scenario, according to embodiments of the present disclosure.

FIG. 10B graphically illustrates example interpolation methodologies, according to embodiments of the present disclosure. Consider Key Pose Sequence$_x$ 1040, which represents the phoneme "Sh". The next consecutive key pose sequence chronically (i.e., the adjacent key pose sequence) is Key Pose Sequence$_{x+1}$ 1045, which represents the phoneme "IY1." In one or more embodiments, their frame position in the output sequence 1030B is determined by the identified timestamp and is placed at the time using the center frame, which is highlighted with a white box. It should be noted that other frames (e.g., first frame or last frame) may be selected as the key frame for the key pose sequence. In the illustrated example, according to the timing for when the phonemes should occur, the "Sh" phoneme is positioned at frame 19 and the "IY1" phoneme is positioned at frame 22. The difference between them may be considered as either 2 frames (if frames 19 and 22 are not included) or 3 frames if a simple difference is used (e.g., 22-19).

Returning to FIG. 9B, if the difference is greater than the minimum key pose distance, the two consecutive key pose sequences (i.e., Key Pose Sequence$_x$ and Key Pose Sequence$_{x+1}$) may be blended (962). For example, a methodology such as that depicted in FIG. 10A may be used, although other interpolation/blending methods may be used. It shall be noted that the minimum key pose distance is a threshold value that may be set or adjusted and may be different than in other embodiments.

If the difference is less than or equal to the minimum key pose distance, in one or more embodiments, check is made (956) to determine if the adjacent key pose sequence is the last one in the total sequence. If it is not the last one, blending may be performed (960) using the key pose sequence (i.e., Key Pose Sequence$_x$) and the key pose sequence after the adjacent key pose sequence—namely, Key Pose Sequence$_{x+2}$. For example, returning to FIG. 10B, interpolation may be performed using Key Pose Sequence$_x$ 1040 and Key Pose Sequence$_{x+2}$ 1050, and it may be performed using a weighted sum method such as depicted in FIG. 10A. In yet another embodiment, the interpolation using Key Pose Sequence$_x$ 1040 and Key Pose Sequence$_{x+2}$ 1050 may also include using at least part of the intermediate key pose sequence (i.e., Key Pose Sequence$_{x+1}$ 1045). For example, the weighted sum interpolation using Key Pose Sequence$_x$ 1040 and Key Pose Sequence$_{x+2}$ 1050 may also include one or more frames of Key Pose Sequence$_{x+1}$ 1045, such as its center frame, so that at least its center frame is blended into the overall sequence. One skilled in the art shall recognize a number of different possible interpolations and combinations may be used.

If it is determined (956) that the adjacent key pose sequence is the last one in the total sequence, in one or more embodiments, it may be used for interpolation with the initial key pose sequence, Key Pose Sequence$_x$. In one or more embodiments, blending may be performed (958) in a same or similar manner as above with respect to step 962. Alternatively, in one or more embodiments, the blending may be performed (958) in a same or similar manner as above with respect to step 960, wherein one or more frames of the adjacent key pose sequence is treated as a proxy for the next consecutive key pose sequence. For example, turning to FIG. 10B, if Key Pose Sequence$_{x+1}$ 1045 was the last key pose sequence in the overall sequence, its last frame (i.e., frame 25) may be treated as a proxy for Key Pose Sequence$_{x+2}$ (which in this example does not exists). Again, one skilled in the art shall recognize a number of different possible interpolations and combinations may be used.

Returning to FIG. 9B, the process continues by determining whether another key pose sequence is to be processed (964). If another key pose sequence is to be processed, the method returns to step 950 and the process repeats. If there are no more key pose sequences for processing, in one or more embodiments, smoothing may be performed (966), and a final sequence of poses is output (966).

Figure 9C:
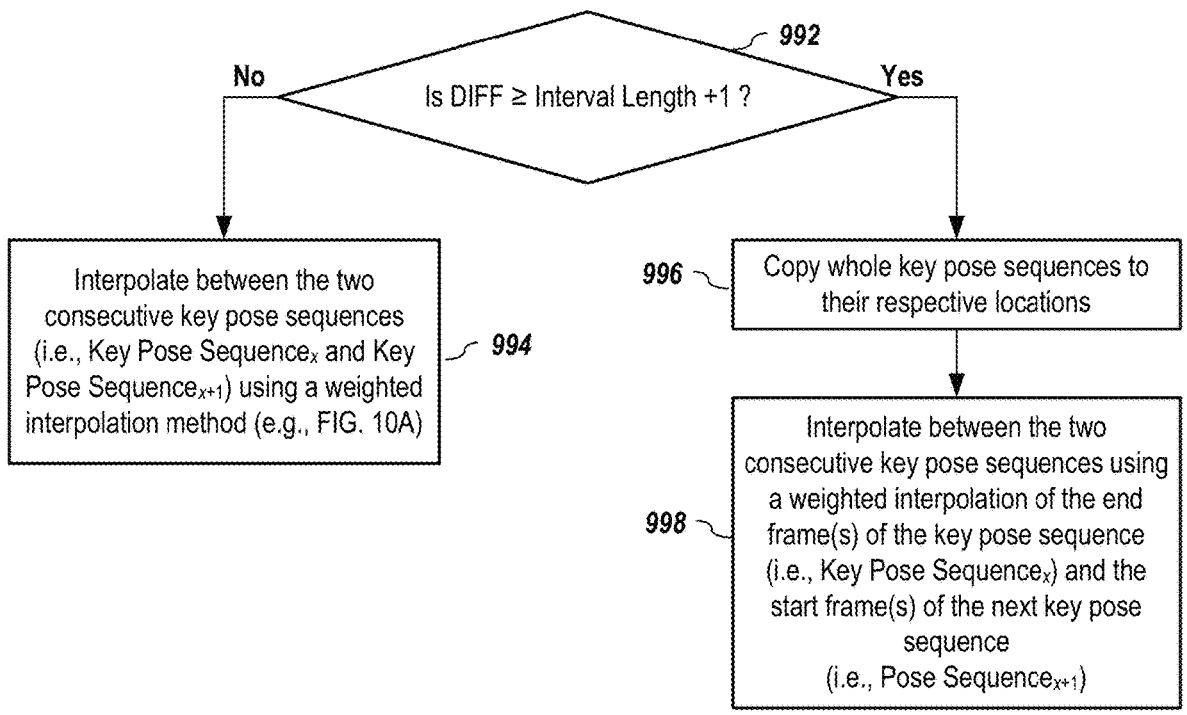
FIG. 9C depicts yet more additional and/or alternative interpolation strategies, according to embodiments of the present disclosure.

FIG. 9C depicts yet another additional and/or alternative interpolation strategies, according to embodiments of the present disclosure. In one or more embodiments, a check may be included (992) that checks if the difference between adjacent key pose sequences is greater than or equal to a threshold, which may be defined as the interval length+1. It shall be noted that the interval distance+1 is a threshold value that may be set or adjusted and may be different than in other embodiments. Consider, by way of illustration, FIG. 10C.

Figure 10C:
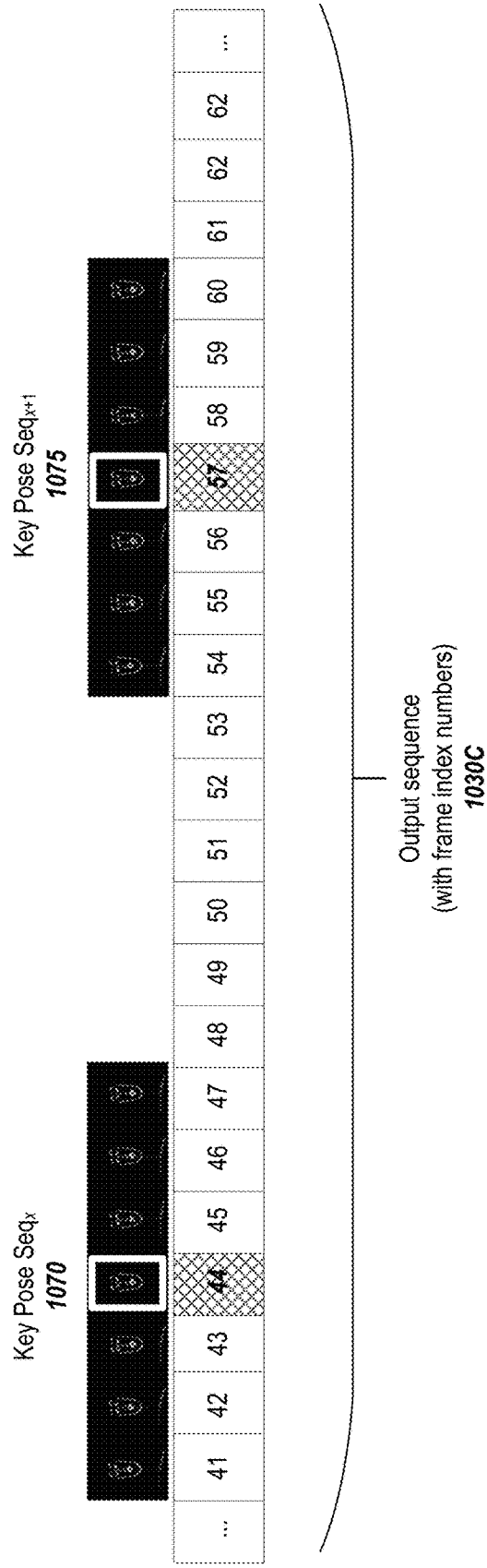
FIG. 10C illustrates yet another example interpolation scenario, according to embodiments of the present disclosure.

FIG. 10C illustrates yet another example interpolation scenario, according to embodiments of the present disclosure. Depicted in FIG. 10C is a first key pose sequence, Key Pose Sequence$_x$ 1070, and an adjacent key pose sequence, Key Pose Sequence$_{x+1}$ 1075. In the output sequence 1030C, there is a significant gap between the two adjacent key pose sequences.

Returning to FIG. 9C, if the difference is greater than or equal to the threshold, the two consecutive key pose sequence (i.e., Key Pose Sequence$_x$ and Key Pose Sequence$_{x+1}$) are copied (996) to their respective locations. In one or more embodiments, the frames between the two consecutive key pose sequence are interpolated (998) using a weighted interpolation of the end frame of the key pose sequence (i.e., Key Pose Sequence$_x$) and the start frame of the next key pose sequence (i.e., Pose Sequence$_{x+1}$). Alternatively or additionally, one or more rest frames may be placed in the middle of the gap and blending may be performed using the rest frame as a key frame pose.

If the difference is not greater than or equal to the threshold, the two consecutive/adjacent key pose sequence (i.e., Key Pose Sequence$_x$ and Key Pose Sequence$_{x+1}$) may be blended (994). For example, a methodology the same as or similar to that depicted in FIG. 10A may be used, although other interpolation/blending methods may be used.

Figure 11:
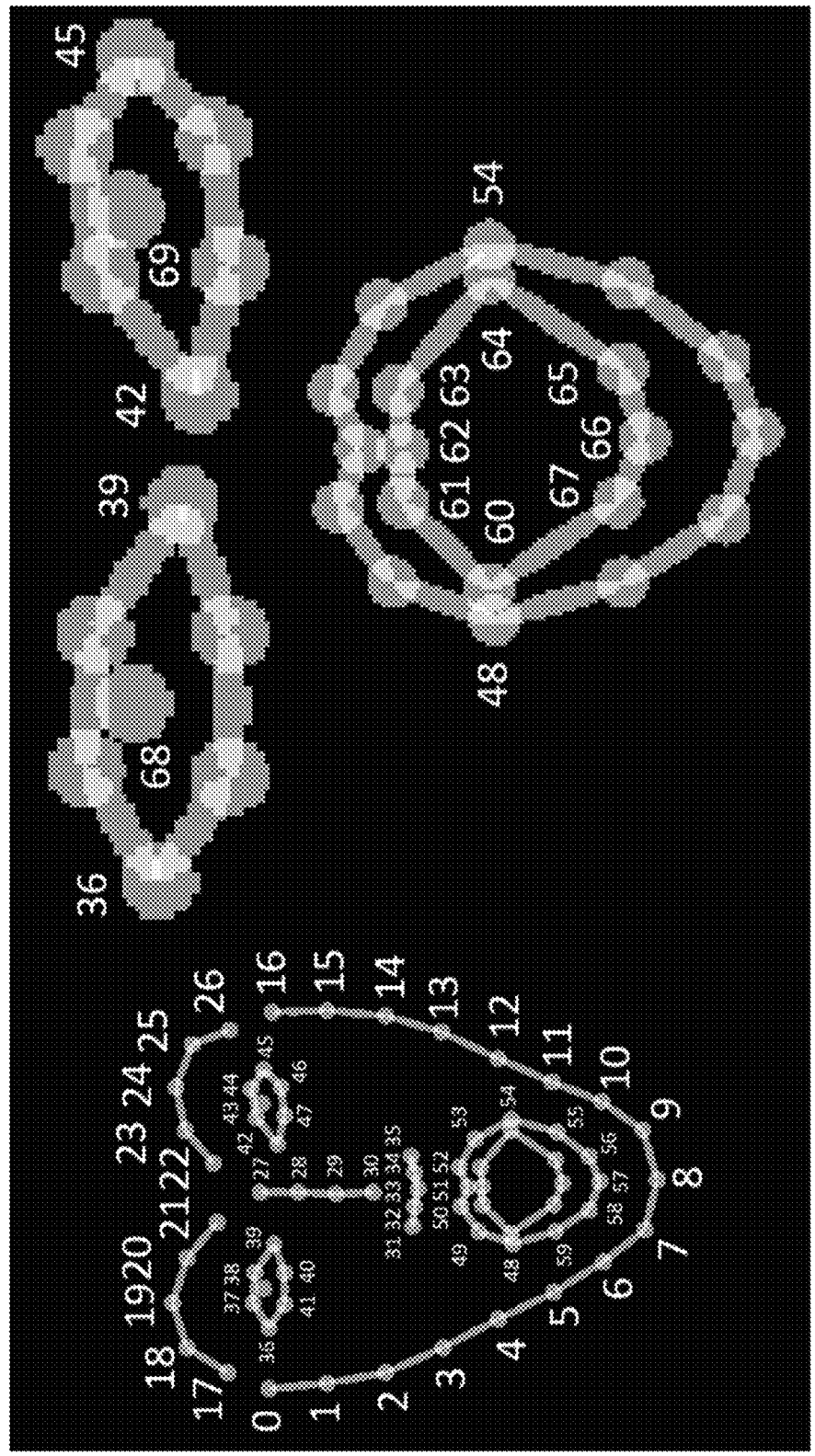
FIG. 11 depicts face points, including mouth points, according to embodiments of the present disclosure.

After key pose sequences have been interpolated into the sequence of poses, in one or more embodiments, one or more smoothing operations may be performed. In one or more embodiments, the phoneme pose is directly copied to its time point within the video, and the smoothing of the motion of poses is affected by or controlled by a smooth width parameter. In one or more embodiments, the smooth width is typically set at a value in the range of 4-9 frames, but other values and ranges may be used. To make human motion more stable, all face keypoints are smoothed except the mouth parts, which points are shown in FIG. 11.

Figure 12:
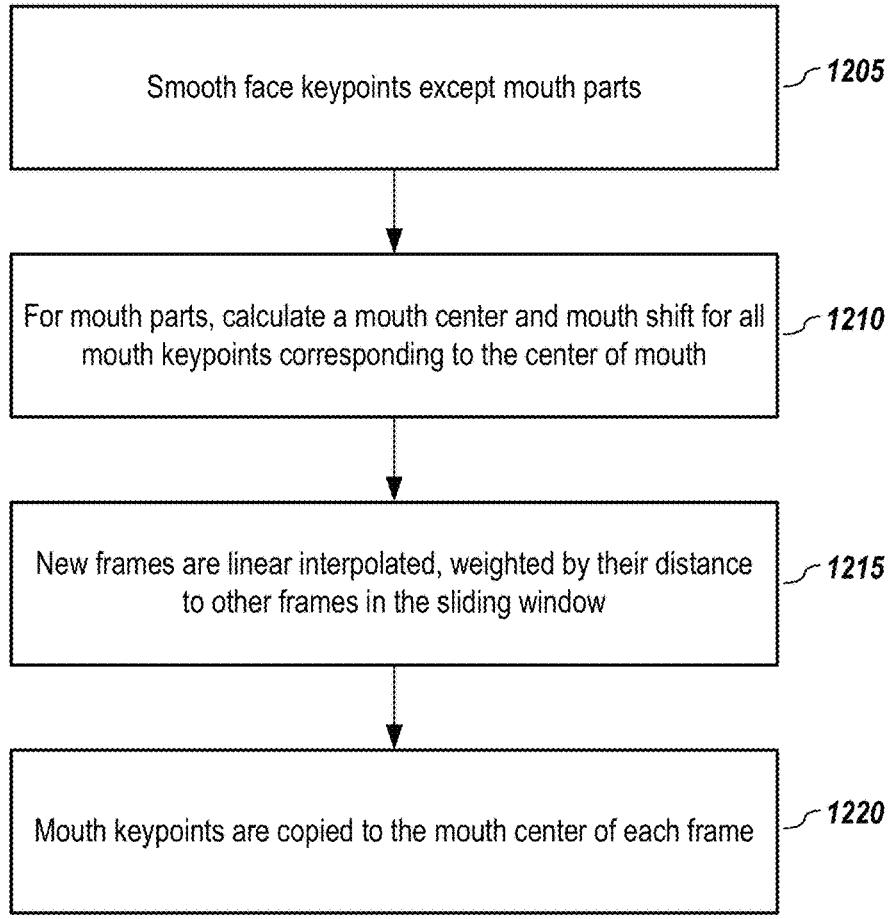
FIG. 12 depicts a method for smoothing, according to embodiments of the present disclosure.

FIG. 12 depicts a method for smoothing, according to embodiments of the present disclosure. Since smoothing the mouth directly may sacrifice the accuracy of mouth shape corresponding to each phoneme, in one or more embodiments, all 68 face keypoints except the mouth parts (e.g., points 48-67) are smoothed. A mouth center and mouth shift are calculated (1210) for mouth keypoints corresponding to the center of mouth. Then, the frames are replaced from a start frame to a key pose by inputting or replacing (1215) the frames with new frames that are linearly interpolated between other frames (e.g., the start frame and key pose frame), weighted by their distance to those two frames. Mouth keypoints are copied (1220) to the mouth center of the face in each frame. In one or more embodiments, frames are smoothed one-by-one in a sliding window until the end of the pose sequences.

One skilled in the art shall recognize that other interpolation (e.g., polynomial, spine, learned via modeling, piecewise, etc.) and smoothing (e.g., gaussian, weighted moving average, exponential smoothing, linear exponential, learned via modeling, etc.) methods may be used.

D. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Datasets. To validate embodiments, video dataset consists of video and corresponding audio recordings of a number of female and male subjects reading sentences was used. There were ten sentences for each person. The sentences' mean duration was 4.25 seconds, or about 106 video frames (at 25 fps).

To test embodiments, an additional dataset was created. A female native English speaker was invited to record the data via teleconference. If a video is recorded on the user's side, the resolution can be as high as 1280×720. The video from the teleconference meeting with the subject was captured, and the resolution was 448×512. Prompts, including 44 words and 20 sentences, were prepared. Examples of the words are shown in TABLE 1 (below), which were transcribed in ARPABET. Either recording a video of 44 words or 20 sentences will cover all phonemes in English.

TABLE 1

Word-Phoneme table with lexical stress.

| Word | Vowel | Transcription |
|------|-------|---------------|
| beat | IY1 | B IY1 T |
| bit | IH | B IH1 T |
| bait | EY1 | B EY1 T |
| bet | EH1 | B EH1 T |
| bat | AE1 | B AE1 T |
| bob | AA1 | B AA1 B |
| bought | AA1 | B AA1 T |
| boat | OW1 | B OW1 T |
| book | UH1 | B UH1 K |
| boot | UW1 | B UW1 T |
| bird | ER1 | B ER1 D |
| ago | AH0 | AH0 G OW1 |
| but | AH1 | B AH1 T |
| buy | AY1 | B AY1 |
| down | AW1 | D AW1 N |
| boy | OY1 | B OY1 |
| bat | AE1 | B AE1 T |
| deep | IY1 | D IY1 P |
| go | OW1 | G OW1 |
| pea | IY1 | P IY1 |
| tea | IY1 | T IY1 |
| kick | IH1 | K IH1 K |
| vice | AY1 | V AY1 S |
| ... | ... | ... |

Figure 13:
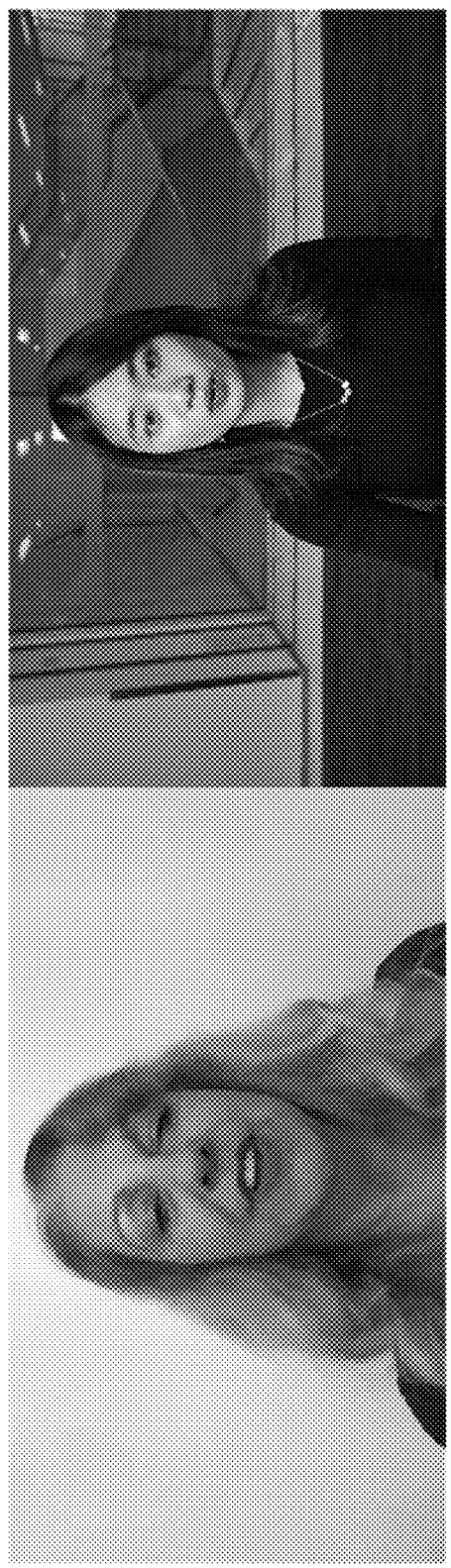
FIG. 13 presents two frames from recorded videos of two models—the English speaker video frame example is on the left (1305), and the Chinese speaker video frame example is on the right (1310), according to embodiments of the present disclosure.

Embodiments were also tested in other languages like Mandarin Chinese. A native Mandarin Chinese speaker (female) was used as a model, and a video of her reading a list of 386 syllables in Pinyin was captured. The total recorded video was approximately 8 minutes. Two pictures from the recorded videos of these two models are shown in FIG. 13. The English speaker video frame example is on the left (1305), and the Chinese speaker video frame example is on the right (1310). Other videos of a Chinese speaker were also used to embodiments. The four datasets are compared in TABLE 2 (below).

| | Training video time | Captured by/ Data From | Video Resolution | Phoneme-pose dictionary built from |
|---|---|---|---|---|
| Dataset A | 1 min/person, 43 people | Digital camera | 512 × 384 | 10 sentences |
| American Female | Total 6 min. | Teleconference | 640 × 480 | 44 words |
| Chinese Female | Total 8 min. | Digital camera | 1920 × 1080 | 386 Pinyin |
| Chinese Male | Total 10 min. | Online video | 512 × 448 | Pinyin extracted from video |

1. Comparison

To evaluate the generated videos' quality, a human subjective test was conducted on Amazon Mechanical Turk (AMT) with 401 participants. A total of 5 videos were shown to the participants. The participants were required to rate those videos' quality on a Likert scale from 1 (very bad) to 5 (very good). The ratings include 1) The face in the video is clear; 2) The face motion in the video looks natural and smooth; 3) The audio-visual alignment (lip-sync) quality; 4) the overall visual quality of the video. Results were compared with state of the art (SoTA) approaches using user study, including LearningGesture (Ginosar et al. (2019)), neural-voice puppetry (Thies et al. (2019)), and Speech2Video (Liao et al. (2020)). Since these three methods are audio-based and use real human voices in their demo videos, a real human voice was also used for comparison. TABLE 3 shows the scores from the user study for all methods. The tested embodiment had the best overall quality score compared to the other three SOTA methods. It should be noted that the embodiment is a text-based method, which is more flexible than the aforementioned audio-based methods and is not subject to vulnerability due to speaker variation.

TABLE 3

Average scores of 401 participants on 4 questions. Q1: Is the face clear? Q2: Does the face motion in the video look natural and smooth? Q3: Rate the audio-visual alignment (lip sync) quality. Q4: Rate the overall visual quality.

|  | Q1 | Q2 | Q3 | Q4 |
|---|---|---|---|---|
| LearningGesture | 3.424 | 3.267 | 3.544 | 3.204 |
| Neural-voice-puppetry | 3.585 | 3.521 | 3.214 | 3.465 |
| Speech2Video | 3.513 | 3.308 | 3.094 | 3.262 |
| Tested Embodiment | 3.761 | 3.924 | 3.467 | 3.848 | ment showed an overall visual quality that has barely correlated with the voice quality. The fact proves that the text-based embodiments of the current patent document have advantages over audio-based methods.

TABLE 4

Average scores of 401 participants on 4 questions. Q1: Is the face clear? Q2: Does the face motion in the video looks natural and smooth? Q3: Rate the audio-visual alignment (lip sync) quality. Q4: Rate the overall visual quality.

|  | Q1 | Q2 | Q3 | Q4 |
|---|---|---|---|---|
| TTS | 3.33 | 3.51 | 3.23 | 3.09 |
| Human voice | 3.28 | 3.50 | 3.21 | 3.18 |
| Real video | 3.52 | 3.87 | 3.86 | 3.46 |

3. Running Times and Hardware

Here, the tested embodiment was compared with SythesisObama, Neural-voice-puppetry, and Speech2Video on training data, preprocessing time, training time, and inference time. The information is reported in TABLE 5, below.

TABLE 5

|  | Synthesizing Obama | Neural-voice-puppetry | Speech2Video | Text2Video Embodiment |
|---|---|---|---|---|
| Training data | 17 hr | 3 min + | ~20 min | 1 min |
| Preprocessing time | 2 weeks on 10 cluster nodes of Intel Xeon E5530 | a few hours | a few hours | ~10 mins |
| Training time | 2 hours on NVIDIA TitanX and Intel Core i7-5820K | ~28 hour on Nvidia 1080Ti; Rendering networks: ~30 hours training time | Several days on Nvidia Tesla M40 | ~4 hours on Nvidia Tesla M40 |
| Inference time (per frame) | 1.5s on NVIDIA TitanX and Intel Core i7-5820K | 0.01-0.1 s on Nvidia 1080Ti | 0.5 s on Nvidia 1080Ti | 0.1 s on Nvidia 1080Ti |

2. User Study

The following user study was also implemented to validate the effectiveness of embodiments. Three videos were shown to the participants. The same text input was used as was used in the real speech video to generate two synthesized videos, one with the real person speech and the other with a TTS voice. The remaining one is the real speech video. All videos randomly presented to the participants without telling the participants which one was real. As shown in TABLE 4, the output video using an embodiment herein with human voice received a score of 3.18, and the real video received a score of 3.46 (out of 5) on overall visual quality. The generated video is 91.9% of the overall quality of the real video. In particular, the embodiment has similar performance on face clarity and motion smoothness compared to the real video. The TTS version of the video received 89.0% of the overall quality of the real video. The little difference likely comes from the quality of the TTS audio. Here, an average female voice was selected for the experiment. Using a better TTS or using a learning method to train a personalized human voice could improve the overall audio quality. Based on the user study, the text-based video generation methodology of the present patent docu- As can be seen in the table, the Text2Video embodiment required the least amount of data to train a model. For instance, using the fine-grained 40-words or 20-sentence list to capture all phonemes in English, the training video input is less than 1 minute. Using existing videos to extract a phoneme-pose dictionary will also make the training data a similar size. The total number of images used to train the embodiment is around 1250 images for 25 fps 60s video.

A Text2Video embodiment methodology was also compared with Synthesizing Obama, neural-voice-puppetry, and Speech2Video method on training data duration, data preprocessing time, model training time, and video inference time. The listed statistics are from their papers. The Text2Video embodiment methodology used the least preprocessing time among all four approaches to prepare training data. Preprocessing time of the Text2Video embodiment methodology included running OpenPose and building up a phoneme-pose dictionary.

The training time of the tested Text2Video embodiment methodology was relatively short. It took about 4 hours to finish 15 epochs of training on a cluster of 8 NVIDIA Tesla M40 24G GPUs. For the tested dataset, which has videos with resolution of 512×384, a model trained on 15 epochs is good for inference.

The inference time of the tested embodiment was similar to Neural-voice-puppetry but much faster than SythesisObama and Speech2Video. The video generation rate is around ten fps on a single NVIDIA GTX 1080 GPU.

4. Some Observations

Presented herein are embodiments of a novel methodology to synthesize talking-head speech video from any text input. Also presented herein are automatic pose extraction method embodiments to build a phoneme-pose dictionary from any video. Compared to other state-of-the-art audio-driven methods, the text-based video synthesis method embodiments presented herein use a fraction of the training data and significantly reduces inference time. The effectiveness of embodiments was demonstrated using the English and Chinese languages, although it should be noted that embodiments may be applied to other languages. Embodiments may also comprise integrating voice learning methods in the training pipeline to generate personalized voices.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touch-screen and/or video display. The computing system may also include one or more buses operable to transmit communications between the various hardware components.

Figure 14:
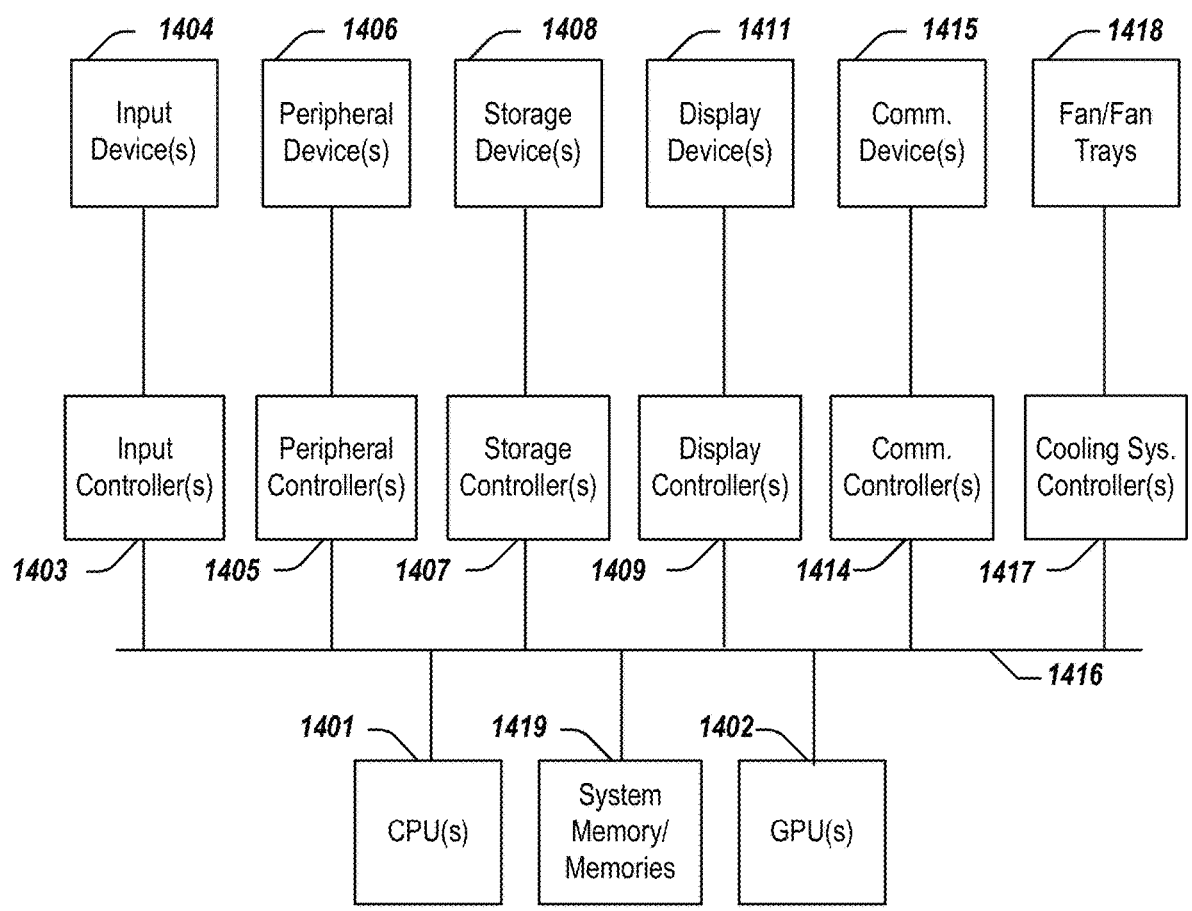
FIG. 14 depicts a simplified block diagram of a computing device/information handling system, according to embodiments of the present disclosure.

FIG. 14 depicts a simplified block diagram of an information handling system (or computing system), according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14, the computing system 1400 includes one or more central processing units (CPU) 1401 that provides computing resources and controls the computer. CPU 1401 may be implemented with a microprocessor or the like, and may also include one or more graphics processing units (GPU) 1402 and/or a floating-point coprocessor for mathematical computations. In one or more embodiments, one or more GPUs 1402 may be incorporated within the display controller 1409, such as part of a graphics card or cards. Thy system 1400 may also include a system memory 1419, which may comprise RAM, ROM, or both.

A number of controllers and peripheral devices may also be provided, as shown in FIG. 14. An input controller 1403 represents an interface to various input device(s) 1404, such as a keyboard, mouse, touchscreen, and/or stylus. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present disclosure. Storage device(s) 1408 may also be used to store processed data or data to be processed in accordance with the disclosure. The system 1400 may also include a display controller 1409 for providing an interface to a display device 1411, which may be a cathode ray tube (CRT) display, a thin film transistor (TFT) display, organic light-emitting diode, electroluminescent panel, plasma panel, or any other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1400 comprises one or more fans or fan trays 1418 and a cooling subsystem controller or controllers 1417 that monitors thermal temperature(s) of the system 1400 (or components thereof) and operates the fans/fan trays 1418 to help regulate the temperature.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means"

terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
given an input text, identifying phonemes in the input text;
generating speech audio from the input text using a text-to-speech (TTS) system;
obtaining phoneme timestamps that identify time occurrences in the generated speech audio of phonemes of the input text;
using a phoneme-pose dictionary that correlates phonemes to key pose sequences, the phoneme timestamps, and interpolation to generate a sequence of poses corresponding to the phonemes in the input text;
using the sequences of poses and a trained generative neural network model to generate a video; and
combining the generated video with the generated speech audio to obtain a final output video.

2. The computer-implemented method of claim 1 wherein the step of obtaining phoneme timestamps that identify time occurrence in the generated speech audio of phonemes of the input text comprises:
using forced alignment to align the phonemes in the input text with corresponding phonemes in the generated speech audio to obtain the phoneme timestamps.

3. The computer-implemented method of claim 1 wherein the step of identifying phonemes in the input text comprises:
mapping words in the input text into phonemes using a pronouncing dictionary, grapheme-to-phoneme rules, or both.

4. The computer-implemented method of claim 1 wherein the step of using a phoneme-pose dictionary that correlates phonemes to key pose sequences, the phoneme timestamps, and interpolation to generate a sequence of poses corresponding to the phonemes in the input text comprises:
determining an interval distance between the key pose sequence and a chronologically adjacent key pose sequence;
responsive to the interval distance being equal to a minimum key pose distance, adding the key pose sequence to the sequence of key poses;
responsive to the interval distance being greater than the minimum key pose distance, adding one or more rest frames between the key pose sequence and the chronologically adjacent key pose sequence when adding the key pose sequence to the sequence of key poses; and
responsive to the interval distance being less than the minimum key pose distance, blending one or more frames of the key pose sequence with one or more frames of the chronologically adjacent key pose sequence when adding the key pose sequence to the sequence of key poses.

5. The computer-implemented method of claim 1 wherein the step of using the sequence of poses and a trained generative neural network model to generate a video comprises:
converting the sequence of poses into a final sequence of poses by applying one or more smoothing operations to the sequence of key poses; and
inputting the final sequence of poses into the trained generative neural network model to generate the video.

6. The computer-implemented method of claim 5 wherein the step of applying one or more smoothing operations to the sequence of poses comprises:
applying smoothing to the sequence of poses, in which face keypoints are smooth differently from mouth keypoints to better preserve accuracy of mouth position for the phonemes.

7. A computer-implemented method for generating a text-to-video system, the method comprising:
building a phoneme-pose dictionary that correlates phonemes to key pose sequences by performing steps comprising:
for each input video from a set of training input videos:
extracting key pose sequences from the input video;
given audio from the input video and a corresponding transcript for the input video, identifying phonemes and their time positions in the audio; and
aligning the identified phonemes with their corresponding key pose sequences using the time positions; and adding each unique phoneme and its corresponding key pose sequence to the phoneme-pose dictionary;

training a generative neural network model that generates photorealistic video using image sequences from training videos and their corresponding poses as inputs into a generative adversarial network (GAN) that comprises the generative neural network model; and forming a text-to-video system comprising:
- a text-to-speech (TTS) system that generates speech audio from an input text;
- the phoneme-pose dictionary that is used to generate a sequence of poses corresponding to the phonemes in the input text; and
- the trained generative neural network model to generate a video corresponding to the sequence of poses, which is combined with the generated speech audio to obtain a final output video.

8. The computer-implemented method of claim 7 wherein the corresponding transcript is obtained by inputting audio for the input video into a speech-to-text system to obtain the corresponding transcript.

9. The computer-implemented method of claim 7 wherein the step of determining phonemes comprises:
mapping words in the corresponding transcript into phonemes using a pronouncing dictionary, grapheme-to-phoneme rules, or both.

10. The computer-implemented method of claim 7 wherein the step of given audio from the input video and a corresponding transcript for the input video, identifying phonemes and their time positions in the audio comprises:
using forced alignment to align phonemes in the corresponding transcript with corresponding phonemes in the audio to obtain the time positions.

11. The computer-implemented method of claim 7 wherein the text-to-video system further comprises a key pose insertion module that using the phoneme-pose dictionary that correlates phonemes to key pose sequences, time positions, and interpolation to generate the sequence of poses corresponding to the phonemes in the input text.

12. The computer-implemented method of claim 11 wherein the step of using the phoneme-pose dictionary that correlates phonemes to key pose sequences, time positions, and interpolation to generate the sequence of poses corresponding to the phonemes in the input text comprises:
- at the time positions of a phoneme, identifying in the phoneme-pose dictionary a key pose sequence corresponding to the phoneme;
- determining an interval distance between the key pose sequence and a chronologically adjacent key pose sequence;
- responsive to the interval distance being equal to a minimum key pose distance, adding the key pose sequence to the sequence of key poses;
- responsive to the interval distance being greater than the minimum key pose distance, adding one or more rest frames between the key pose sequence and the chronologically adjacent key pose sequence when adding the key pose sequence to the sequence of key poses; and
- responsive to the interval distance being less than the minimum key pose distance, blending one or more frames of the key pose sequence with one or more frames of the chronologically adjacent key pose sequence when adding the key pose sequence to the sequence of key poses.

13. The computer-implemented method of claim 12 wherein the text-to-video system is further configured to perform steps comprising:
converting the sequence of poses into a final sequence of poses by applying one or more smoothing operations to the sequence of key poses; and
inputting the final sequence of poses into the trained generative neural network model to generate the video.

14. The computer-implemented method of claim 13 wherein the step of applying one or more smoothing operations to the sequence of poses comprises:
applying smoothing to the sequence of poses, in which face keypoints are smooth differently from mouth keypoints to better preserve accuracy of mouth position for the phonemes.

15. A text-to-video system comprising:
- a phoneme-pose dictionary that correlates phonemes to key pose sequences;
- a trained generative neural network model for generating a video;
- one or more processors; and
- a non-transitory computer-readable medium or media comprising one or more sets of instructions which, when executed by at least one of the one or more processors, causes steps to be performed comprising:
  - given an input text, identifying phonemes in the input text;
  - generating speech audio from the input text using a text-to-speech (TTS) system;
  - obtaining phoneme timestamps that identify time occurrence in the generated speech audio of phonemes of the input text;
  - using the phoneme-pose dictionary that correlates phonemes to key pose sequences, the phoneme timestamps, and interpolation to generate a sequence of poses corresponding to the phonemes in the input text;
  - using the sequences of poses and the trained generative neural network model to generate a video; and
  - combining the generated video with the generated speech audio to obtain a final output video.

16. The system of claim 15 wherein the step of obtaining phoneme timestamps that identify time occurrence in the generated speech audio of phonemes of the input text comprises:
using forced alignment to align the phonemes in the input text with corresponding phonemes in the generated speech audio to obtain the phoneme timestamps.

17. The system of claim 15 wherein the step of identifying phonemes in the input text comprises:
mapping words in the input text into phonemes using a pronouncing dictionary, grapheme-to-phoneme rules, or both.

18. The system of claim 15 wherein the step of using a phoneme-pose dictionary that correlates phonemes to key pose sequences, the phoneme timestamps, and interpolation to generate a sequence of poses corresponding to the phonemes in the input text comprises:
- at the timestamp of a phoneme, identifying in the phoneme-pose dictionary a key pose sequence corresponding to the phoneme;
- determining an interval distance between the key pose sequence and a chronologically adjacent key pose sequence;
- responsive to the interval distance being equal to a minimum key pose distance, adding the key pose sequence to the sequence of key poses;
- responsive to the interval distance being greater than the minimum key pose distance, adding one or more rest frames between the key pose sequence and the chronologically adjacent key pose sequence when adding the key pose sequence to the sequence of key poses; and responsive to the interval distance being less than the minimum key pose distance, blending one or more frames of the key pose sequence with one or more frames of the chronologically adjacent key pose sequence when adding the key pose sequence to the sequence of key poses.

19. The system of claim 15 wherein the step of using the sequence of poses and a trained generative neural network model to generate a video comprises:

converting the sequence of poses into a final sequence of poses by applying one or more smoothing operations to the sequence of key poses; and inputting the final sequence of poses into the trained generative neural network model to generate the video.

20. The system of claim 19 wherein the step of applying one or more smoothing operations to the sequence of poses comprises:

applying smoothing to the sequence of poses, in which face keypoints are smooth differently from mouth keypoints to better preserve accuracy of mouth position for the phonemes.

* * * * *